(12) United States Patent
Fitchett

(10) Patent No.: US 10,803,059 B2
(45) Date of Patent: Oct. 13, 2020

(54) SEARCHING USING QUERY GRAPHS

(71) Applicant: Verizon Patent and Licensing Inc., Basking Ridge, NJ (US)

(72) Inventor: Stephen Alexander Fitchett, Christchurch (NZ)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 354 days.

(21) Appl. No.: 15/883,763

(22) Filed: Jan. 30, 2018

(65) Prior Publication Data
US 2019/0236187 A1 Aug. 1, 2019

(51) Int. Cl.
| G06F 16/00 | (2019.01) |
| G06F 16/2453 | (2019.01) |
| G06F 16/29 | (2019.01) |
| G06F 16/901 | (2019.01) |
| G06F 16/9537 | (2019.01) |
| G06F 16/903 | (2019.01) |
| G06F 16/2452 | (2019.01) |

(52) U.S. Cl.
CPC .. G06F 16/24542 (2019.01); G06F 16/24526 (2019.01); G06F 16/29 (2019.01); G06F 16/9024 (2019.01); G06F 16/90344 (2019.01); G06F 16/9537 (2019.01)

(58) Field of Classification Search
CPC .......... G06F 16/24568; G06F 16/9024; G06F 16/24542; G06F 16/248; G06F 16/29; G06F 16/319; G06F 16/3332; G06F 16/3334; G06F 16/335; G06F 16/90344; G06F 16/9537
See application file for complete search history.

(56) References Cited

U.S. PATENT DOCUMENTS

| 2006/0004892 | A1* | 1/2006 | Lunt | G06F 16/24578 |
| 2009/0327260 | A1* | 12/2009 | Li | G06F 16/3338 |
| 2012/0209858 | A1* | 8/2012 | Lamba | G06F 11/30 707/748 |
| 2013/0103389 | A1* | 4/2013 | Gattani | G06F 40/40 704/9 |
| 2013/0166573 | A1* | 6/2013 | Vaitheeswaran | G06F 16/242 707/749 |
| 2014/0229179 | A1* | 8/2014 | Chotimongkol | G10L 15/1815 704/254 |
| 2014/0344265 | A1* | 11/2014 | Boucher | G06F 16/2423 707/732 |
| 2017/0154080 | A1* | 6/2017 | De Smet | G06F 16/254 |
| 2018/0341684 | A1* | 11/2018 | Dechu | G06F 16/9024 |
| 2019/0146970 | A1* | 5/2019 | Chamieh | G06F 16/284 707/718 |

* cited by examiner

*Primary Examiner* — Merilyn P Nguyen

(57) ABSTRACT

A device can receive a search query. The search query can relate to a geographic location. The device can process the search query to parse the search query into a plurality of strings. The plurality of strings can include text. The device can determine that one or more strings, of the plurality of strings, satisfy a condition. The device can generate, using the plurality of strings, a query graph that includes a plurality of paths relating to the condition. The query graph can further include a plurality of nodes leading to and/or included in the plurality of paths, and a plurality of transitions between the plurality of nodes. The device can perform one or more actions relating to the query graph to obtain, from a data structure, one or more search results that correspond to the search query.

20 Claims, 12 Drawing Sheets

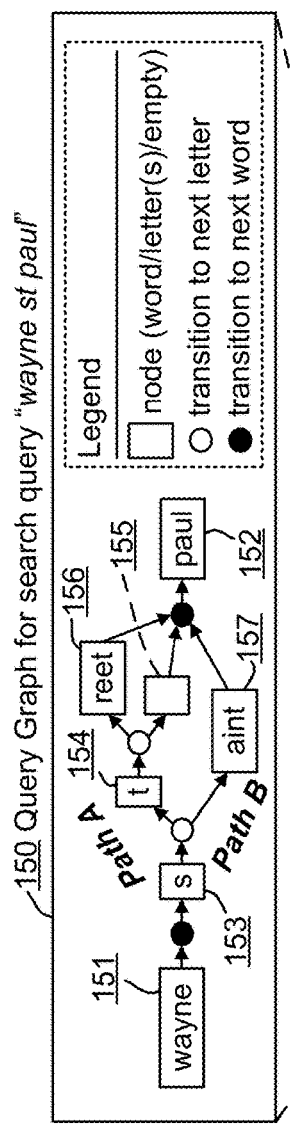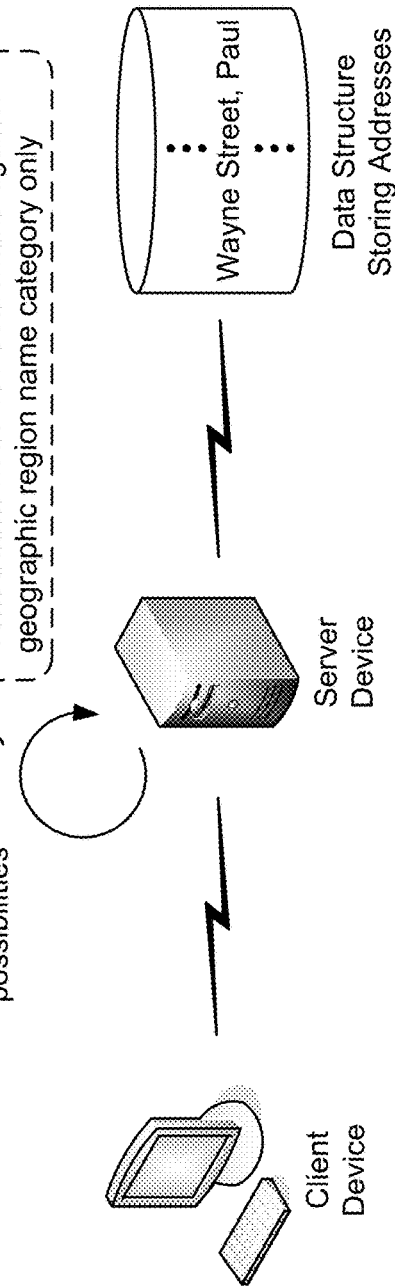
FIG. 1B

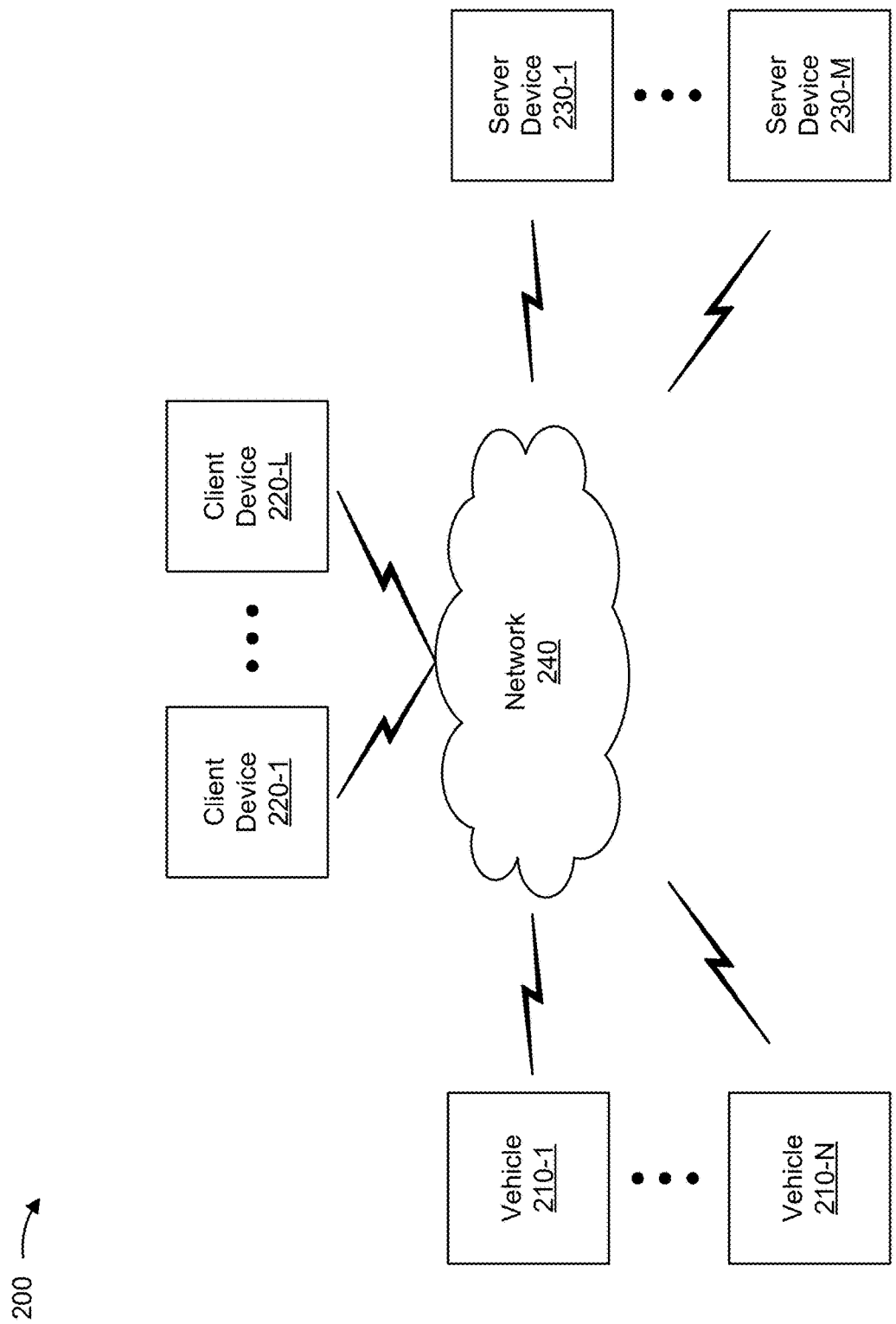

SEARCHING USING QUERY GRAPHS

BACKGROUND

A search system (e.g., a search engine) typically responds to search queries by searching a data structure (e.g., a search index) based on the search queries, and providing results obtained from the data structure. Search queries can be submitted to a search system by users via user devices.

BRIEF DESCRIPTION OF THE DRAWINGS

FIGS. 1A-1C are diagrams of an overview of an example implementation described herein;

FIG. 2 is a diagram of an example environment in which systems and/or methods, described herein, can be implemented;

DETAILED DESCRIPTION OF PREFERRED EMBODIMENTS

Figure 1A:
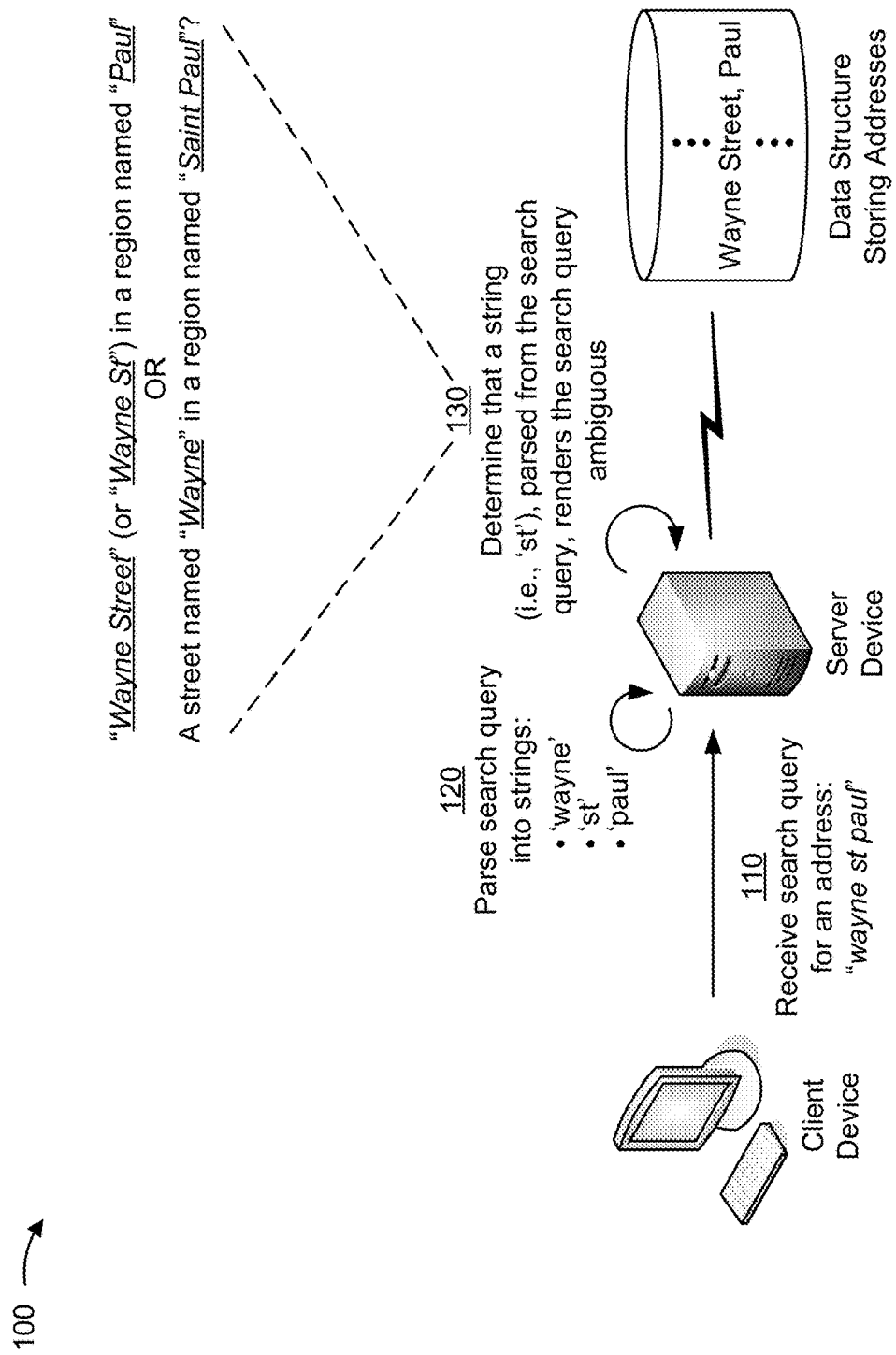

The following detailed description of example implementations refers to the accompanying drawings. The same reference numbers in different drawings can identify the same or similar elements.

Users frequently submit search queries (e.g., to search for one or more addresses) that are ambiguous. For example, a search query "Wayne st paul" can be ambiguous since the search query can be interpreted in multiple ways—as a search for a street named "Wayne" in a geographic region named "Saint Paul," or as a search for a street named "Wayne St" (or "Wayne Street") in a geographic region named "Paul." As another example, a search query "5 main st, FL 25" can be ambiguous since the string 'FL 25' can be interpreted as "Floor 25" or "Florida" and a prefix "25" of a zip code. In some cases, a server device, that receives (e.g., over a network) and processes an ambiguous search query, might be incapable of resolving the ambiguity, without making assumptions regarding the possible interpretations of the search query, and without explicitly searching each such interpretation. However, some or all of the assumptions might be incorrect, which can lead the search astray. Additionally, explicitly searching multiple possibilities can also be inefficient, since such searching increases the search space, as more areas of a data structure (e.g., a search index) will need to be searched.

Some implementations, described herein, provide a device (e.g., a server device) that is capable of resolving ambiguities in a search query during the search process. In some implementations, as described herein, the device is capable of generating, based on a search query, a query graph that includes multiple paths with corresponding nodes that relate to different search possibilities, and providing a search process that utilizes the query graph to direct and/or guide the search. In some implementations, one or more of the nodes can each be associated with a constraint that restricts searching of the node to a particular category of data in a data structure. In some implementations, the search process can traverse the query graph, beginning at a root node of the query graph, to identify matches in the data structure, and advance through the query graph (e.g., through one or more of the multiple paths and corresponding nodes) and through the data structure (e.g., through various categories of data in the data structure) based on interim result(s) obtained from the data structure (e.g., based on matches against the data in the data structure). This permits the search process to disambiguate between search query interpretations as matches are found in the data structure during the search, which reduces or eliminates a need to make assumptions regarding the possible interpretations of a search query at the outset (thereby yielding more satisfactory results), and reduces or eliminates a need to explicitly search each such possible interpretation. Although the search process might traverse more than one path of the query graph, the search process can abandon further searching of later node(s) in a path if no matches are found in the data structure for earlier node(s) in the path. This reduces the search space and increases the efficiency of the search (thereby reducing a time needed to perform the search and conserving processing and/or memory resources of the device). Furthermore, this reduces or eliminates a need for a user to expend additional time on the search system, which permits users to receive search results much more quickly, reduces network traffic to and from the device, and increases the overall operational speed of the device and the network.

Figure 1C:
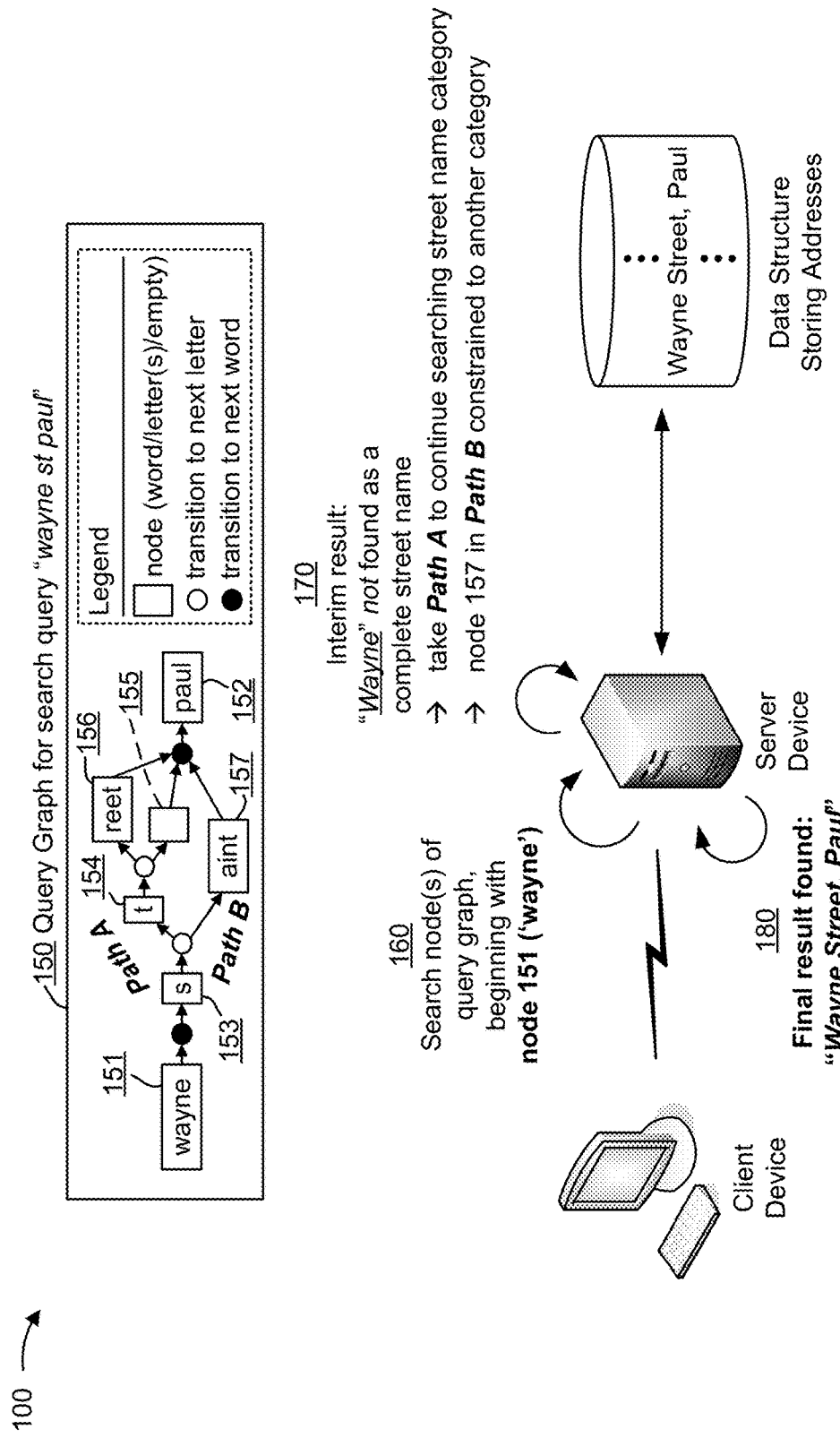

FIGS. 1A-1C are diagrams of an overview of an example implementation 100 described herein. As shown in FIGS. 1A-1C, example implementation 100 can include a client device, a server device, and a data structure (e.g., a search index, a database, and/or the like) that stores addresses. The server device can receive search queries (e.g., for addresses) from the client device (e.g., via a network), and can search the data structure based on the queries. In some implementations, the client device can include a navigation device (e.g., a global positioning system (GPS) receiver) located in a vehicle. In some implementations, the data structure can be stored in a device (e.g., a client device), the server device, and/or another server device. Furthermore, although FIGS. 1A-1C show a single client device, a single server device, and a single data structure, in practice, there can be thousands, millions, billions, etc. of client devices, server devices, and/or data structures. In this way, example implementation 100 can coordinate with a set of devices and/or operate on a data set that cannot be managed manually or objectively by a human actor.

As shown in FIG. 1A, and as shown by reference number 110, the server device can receive a search query from the client device. As shown, the search query can contain an address "wayne st paul." As shown by reference number 120, the server device can parse the search query into individual strings 'wayne,' 'st,' and 'paul.'

As shown by reference number 130, the server device can determine that one of the strings (i.e., the string 'st') renders the search query ambiguous. For example, the server device can determine that the string 'st' might stand for the word "street" or the word "saint." Continuing the example, the server device can determine that the search query "wayne st paul" is either a search for a street named "Wayne Street" (or "Wayne St") in a geographic region (e.g., city or town) named "Paul," or for a street named "Wayne" (i.e., as a complete street name) in a geographic region named "Saint Paul" (or "St Paul"). In this case, and as shown in FIGS. 1A-1C, the data structure (which can include various categories of data, including, for example, a street name category, one or more geographic region name categories (e.g., corresponding to one or more geographic region levels, such as one or more geographic region levels for smaller regions (e.g., neighborhoods, villages, towns, cities, etc.) and/or one or more geographic region levels for larger regions (e.g., counties, states, provinces, countries, etc.)), a postal code (e.g., zip code) category, and/or the like) can contain an entry for the former (i.e., an entry "Wayne Street" corresponding to a geographic region named "Paul"), but not for the latter (i.e., not an entry "Wayne" corresponding to a geographic region named "Saint Paul").

As shown in FIG. 1B, and as shown by reference number 140, the server device can generate, based on the strings, a query graph 150 that the server device can use to direct or guide the search process. As shown, query graph 150 can include nodes and transitions that lead from one node to another node. As shown, a node can contain one or more of the strings parsed from the search query. For example, a node 151 can contain the string 'wayne' and a node 152 can contain the string 'paul.' As shown, query graph 150 can include one or more intra-token transitions (i.e., a transition from a node containing a string that includes one or more letters of a word to a node containing a string that includes one or more other letters of the same word). As shown, query graph 150 can include one or more token transitions (i.e., a transition from a node containing a string that includes one or more letters of one word to a node containing a string that includes one or more letters of a different word).

In some implementations, query graph 150 can be a directed acyclic graph that begins with a root node (e.g., here, node 151), which leads to one or more subsequent nodes via one or more transitions, and that ultimately ends at one or more terminal nodes (e.g., here, node 152), where no loops exist in the query graph. A node that transitions to another node can be referred to as a parent node, and a node that is transitioned to from another node (e.g., a parent node) can be referred to as a child node. In some implementations, the server device can execute a search process that utilizes such a query graph to direct and/or guide the search process (e.g., by traversing, or evaluating, the query graph, beginning from the root node, and searching the string contained in each traversed node for a match in the data structure).

As shown, query graph 150 can include individual nodes 153 and 154 for the substrings 's' and 't,' rather than a single node containing the string 'st.' Here, the server device can determine that the string st' might be interpreted in multiple ways: as "street" (or the abbreviation of "street," i.e., "st") or as the word "saint." In this case, the server device can generate query graph 150 to include multiple paths (including Path A and Path B).

As shown, node 153 ('s') can lead to Path A, which can include node 154 ('t') that leads to multiple sub-paths—one sub-path to a node 155 that is empty (e.g., that contains an empty label) (e.g., for the possibility that there exists an entry "st" in the data structure), and another sub-path to a node 156 containing the string 'reet' (e.g., for the possibility that the string 'st,' parsed from the search query, is an abbreviation of the word "street," and that there exists an entry of the full word "street" in the data structure). As shown, node 153 ('s') can additionally lead to Path B, which can include a node 157 containing the string 'aint' (e.g., for the possibility that the string 'st,' parsed from the search query, is an abbreviation for the word "saint").

In some implementations, the server device can associate a constraint with one or more nodes of a query graph. For example, here, the server device can associate a constraint with node 156 that permits searching of the string contained in node 156 (i.e., 'reet') only in the street name category of data (e.g., only as part of a street suffix).

Additionally, or alternatively, and as another example, the server device can associate a constraint with node 157 that permits searching of the string contained in node 157 ('aint') only in one or more of the geographic region name categories of data, at the beginning of a geographic region name, and/or at the beginning of a street name.

As shown in FIG. 1C, and as shown by reference number 160, the server device can perform the search (e.g., using a search process executed by the server device) by traversing query graph 150, beginning with node 151 ('wayne').

In some implementations, the server device can advance through a query graph and through the data structure based on interim results obtained from the data structure (e.g., matched to the query graph) during the search. In some implementations, the server device can determine boundaries between categories of data to be searched based on such interim results.

Additionally, and in some implementations, the server device can determine, based on one or more constraints associated with a node of a query graph, whether a string contained in the node can be matched against a category of data in the data structure that is currently being searched.

In a case where the server device determines that there does exist an entry "Wayne" as a complete street name in the data structure, the server device can determine that node 153 ('s') (e.g., a child node of node 151) can be the beginning of another category of data in the data structure, such as one of the geographic region name categories of data. In this case, the server device can, for example, search node 153 ('s') and the node(s) in Path B (e.g., node 157 ('aint')) in one of the geographic region name categories of data.

In some implementations the server device can search multiple paths of a query graph. For example, in the above case, where the server device determines that there does exist an entry "Wayne" as a complete street name in the data structure, the server device can additionally search node 153 ('s') and the nodes in Path A (e.g., node 154 ('t'), etc.) in the street name category of data. In this way, the server device can determine, for example, whether, in addition to an entry "Wayne" as a complete street name in the data structure, there also exist entries "Wayne Street" and/or "Wayne St" in the data structure.

Here, as shown by reference number 170, the server device can obtain an interim result indicating that "Wayne" as a complete street name does not exist in the data structure. In this case, the server device can determine, based on this interim result, that the search should remain in the street name category of data in the data structure, and can search node 153 ('s') and the nodes in Path A to search for an entry "Wayne Street" and/or an entry "Wayne St" in the street name category of data. Additionally, and in a case where node 157 ('aint') is constrained to one of the geographic region name categories of data, the server device might not search 'aint' against the street name category of data.

As shown by reference number 180, the server device can, based on continued traversal of query graph 150, obtain a final result—an entry "Wayne Street, Paul"—from the data structure.

In this way, the server device (e.g., the search process) can disambiguate between search query interpretations as matches are found in the data structure during the search. This reduces or eliminates a need to make assumptions regarding the possible interpretations of a search query at the outset (thereby yielding more satisfactory results), and reduces or eliminates a need to explicitly search each such possible interpretation. Although the server device might traverse more than one path of the query graph, the server device can abandon further searching of later node(s) in a path if no matches are found in the data structure for earlier node(s) in the path. This reduces the search space and increases the efficiency of the search (thereby reducing a time needed to perform the search and conserving processing and/or memory resources of the device). Furthermore, this reduces or eliminates a need for a user to expend additional time on the search system, which permits users to receive search results much more quickly, reduces network traffic to and from the device, and increases the overall operational speed of the device and the network.

As indicated above, FIGS. 1A-1C are provided merely as examples. Other examples are possible and can differ from what was described with regard to FIGS. 1A-1C.

FIG. 2 is a diagram of an example environment 200 in which systems and/or methods, described herein, can be implemented. As shown in FIG. 2, environment 200 can include one or more vehicles 210-1 through 210-N (N≥1) (hereinafter referred to collectively as "vehicles 210," and individually as "vehicle 210"), one or more client devices 220-1 through 220-L (L≥1) (hereinafter referred to collectively as "client devices 220," and individually as "client device 220"), one or more server devices 230-1 through 230-M (M≥1) (hereinafter referred to collectively as "server devices 230," and individually as "server device 230"), and a network 240. Devices of environment 200 can interconnect via wired connections, wireless connections, or a combination of wired and wireless connections.

Vehicle 210 includes a mobile machine (e.g., that transports people and/or cargo). For example, a vehicle can include a motor vehicle (e.g., a motorcycle, a bus, a car, a truck, etc.), a railed vehicle (e.g., a train or a tram), a watercraft (e.g., a ship, a boat, a submarine, etc.), an aircraft (e.g., a plane, a glider, or an unmanned aerial vehicle (UAV)), a spacecraft, an electric vehicle (e.g., an electric car or truck), a moped, a scooter, a bicycle, and/or the like. In some implementations, a vehicle can include an autonomous vehicle, such as an autonomous car, an autonomous boat, and/or the like. In some implementations, vehicle 210 can include a system (e.g., a telemetry system, a diagnostic system, a GPS system, such as a navigation device, etc.), client device 220, and/or the like that can submit search queries to server device 230 and receive search results from server device 230, as described elsewhere herein. In practice, there can be thousands, millions, billions, etc. of vehicles 210 communicating data with client device 220 and/or server device 230, which can involve operations on data sets that cannot be managed manually or objectively by a human actor.

Client device 220 includes one or more devices capable of receiving, generating, storing, processing, and/or providing information associated with vehicle 210 and/or server device 230. For example, client device 220 can include a communication and/or computing device, such as a mobile phone (e.g., a smart phone, a radiotelephone, etc.), a desktop computer, a laptop computer, a tablet computer, a handheld computer, a gaming device, a wearable communication device (e.g., a smart wristwatch, a pair of smart eyeglasses, etc.), or a similar type of device. In some implementations, client device 220 can submit search queries to server device 230 and receive search results from server device 230, as described elsewhere herein. In practice, there can be thousands, millions, billions, etc. of client devices 220 communicating data with vehicle 210 and/or server device 230, which can involve operations on data sets that cannot be managed manually or objectively by a human actor.

Server device 230 includes one or more devices capable of receiving, storing, providing, generating, and/or processing information associated with vehicle 210 and/or client device 220. For example, server device 230 can include a server device or a group of server devices (e.g., associated with a multi-server micro data center), a workstation computer or a group of workstation computers, a virtual machine (VM) or a group of virtual machines (VMs) implemented by one or more computing devices provided in a cloud computing environment, or a similar type or group of devices. In some implementations, server device 230 can receive, from vehicle 210 and/or client device 220, one or more search queries (e.g., for addresses), and can provide search results to vehicle 210 and/or client device 220, as described elsewhere herein. In practice, there can be thousands, millions, billions, etc. of server devices 230 communicating data with vehicle 210 and/or client device 220, which can involve operations on data sets that cannot be managed manually or objectively by a human actor.

Network 240 includes one or more wired and/or wireless networks. For example, network 240 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
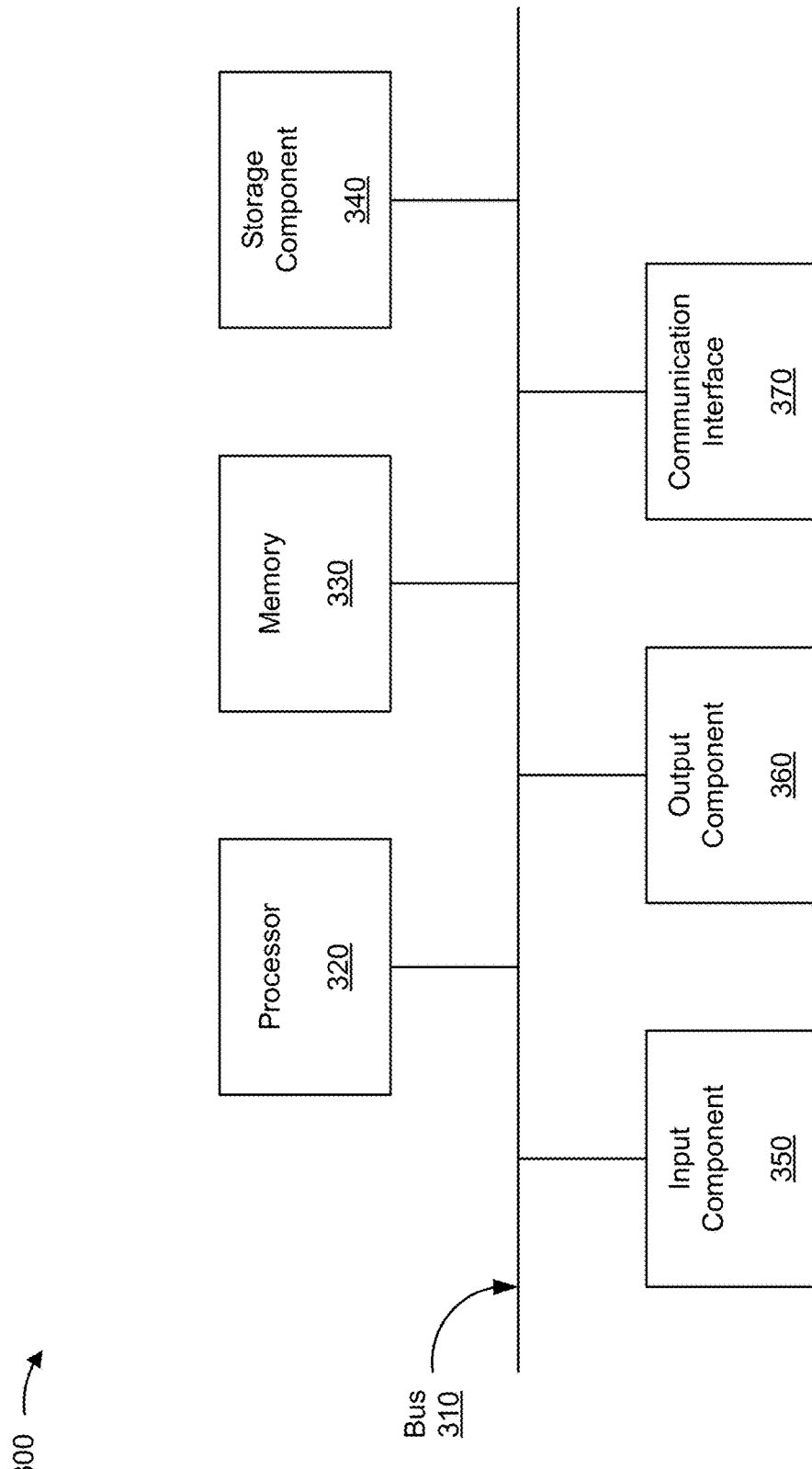
FIG. 3 is a diagram of example components of one or more devices of FIG. 2.

FIG. 3 is a diagram of example components of a device 300. Device 300 can correspond to vehicle 210, client device 220, and/or server device 230. In some implementations, vehicle 210 (or a device associated with vehicle 210), client device 220, and/or server device 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a GPS component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, and/or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
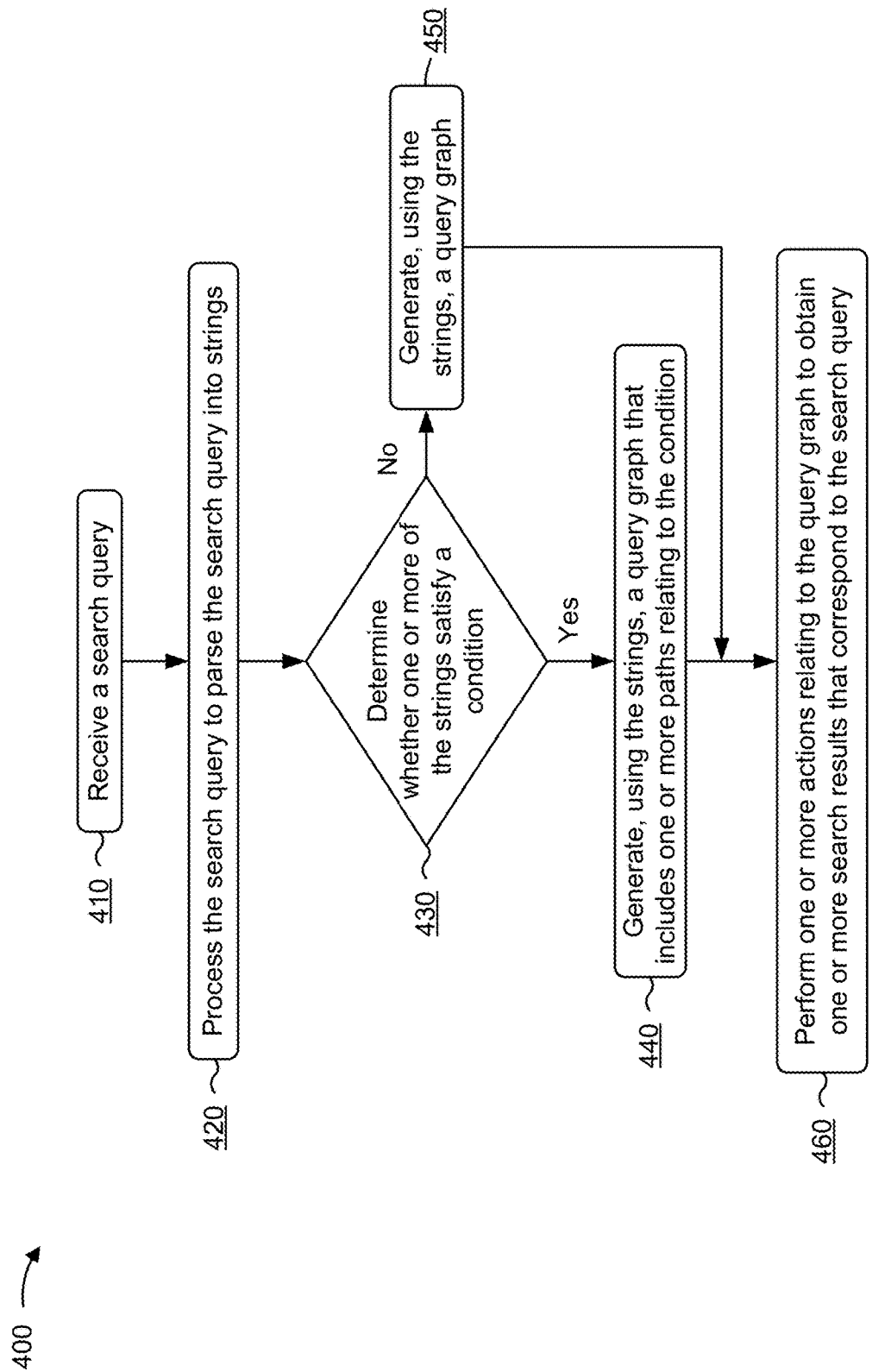
FIG. 4 is a flow chart of an example process for searching using query graphs.

FIG. 4 is a flow chart of an example process 400 for searching using query graphs. In some implementations, one or more process blocks of FIG. 4 can be performed by server device 230. In some implementations, one or more process blocks of FIG. 4 can be performed by another device or a group of devices separate from or including server device 230, such as client device 220 and/or vehicle 210. Additionally, or alternatively, one or more process blocks of FIG. 4 can be implemented as one or more applications (e.g., that can be executed in server device 230, client device 220, and/or vehicle 210).

As shown in FIG. 4, process 400 can include receiving a search query (block 410). For example, server device 230 can receive (e.g., using processor 320, communication interface 370, and/or the like) a search query from client device 220 or vehicle 210 via network 240. In some implementations, server device 230 can receive the search query based on input (e.g., to a user interface) from a user of client device 220 or vehicle 210. In some implementations, the search query can be text-based (e.g., including one or more alphanumeric characters, punctuation symbols, and/or the like). Additionally, or alternatively, the search query can be based on a voice command. In this case, server device 230 can convert the voice command into text for processing. In some implementations, server device 230 can receive thousands, millions, billions, etc. of search queries. In this way, server device 230 can receive search queries that cannot be processed manually or objectively by a human actor.

In some implementations, the search query can be a request to search a data structure. In some implementations, the data structure can be implemented as a trie, a table, a linked list, an array, a database, and/or the like. In some implementations, the data structure can include data organized into various categories, attributes, fields, and/or the like. For example, the data structure can include information regarding geographic locations, such as street addresses. Continuing the example, the street addresses can be organized into different categories of data, such as a house/building number category, a street name category, one or more geographic region name categories (e.g., corresponding to one or more geographic region levels, such as one or more geographic region levels for smaller regions (e.g., neighborhoods, villages, towns, cities, etc.) and/or one or more geographic region levels for larger regions (e.g., counties, states, provinces, countries, etc.)), a postal code (e.g., zip code) category, and/or the like. In some implementations, an entry corresponding to a category of data in the data structure can include one or more words (or tokens). Thus, in a case where the data structure includes addresses, an entry "south main street," corresponding to a street name category of data in the data structure, can include three words—"south," "main," and "street."

Although some implementations are described herein with respect to addresses (e.g., street addresses), the implementations apply equally, or similarly, to any other type of data that is structured (e.g., hierarchically or non-hierarchically) into categories, attributes, fields, and/or the like.

In this way, server device 230 can receive a search query to cause server device 230 to process the search query to parse the search query into strings.

As further shown in FIG. 4, process 400 can include processing the search query to parse the search query into strings (block 420). For example, server device 230 can process (e.g., using processor 320 and/or the like) the search query to parse the search query into strings. In some implementations, server device 230 can process thousands, millions, billions, etc. of search queries. In this way, server device 230 can process search queries in a manner that cannot be performed manually or objectively by a human actor.

In some implementations, server device 230 can process the search query to parse the search query (e.g., to tokenize the search query) based on one or more delimiters. In some implementations, the delimiter(s) can vary depending on the type of data stored in the data structure. For example, for street addresses, the delimiter(s) can include a space character, a comma, one or more ending characters or ending words (e.g., the word "Straße," which is typically included at the end of a street name in Germany), and/or the like. In this case, and as an example, server device 230 can parse a search query "s main st ives, tn" into strings 's,' 'main,' 'st,' and 'tn' based on the space characters and the comma that separate the strings in the search query. For other types of structured data, the delimiter(s) can include some or all of the above-mentioned address-related delimiters, and/or can include one or more other delimiters, such as a semicolon, a hyphen, and/or the like.

In this way, server device 230 can process the search query to parse the search query into strings to cause server device 230 to determine whether one or more of the strings satisfy a condition.

As further shown in FIG. 4, process 400 can include determining whether one or more of the strings satisfy a condition (block 430). For example, server device 230 can determine (e.g., using processor 320 and/or the like) whether one or more of the strings satisfy a condition. In some implementations, server device 230 can cause thousands, millions, billions, etc. of determinations, relating to search queries, to be made. In this way, server device 230 can cause determinations to be made that cannot be performed manually or objectively by a human actor.

In some implementations, the condition can be that one or more strings of the search query might render the search query ambiguous (e.g., as described elsewhere herein, such as with respect to FIG. 1B above). For example, in a case where the search query includes the text "wayne st paul," server device 230 can determine that the string 'st,' of the search query, might correspond to the street name category of data in the data structure (e.g., the string 'st' can be an abbreviation for "street" and be part of a street name (e.g., "Wayne Street")), or alternatively, to one of the geographic region name categories of data in the data structure (e.g., the string 'st' can be an abbreviation for "saint" and be part of a geographic region name (e.g., "Saint Paul")), and thus satisfies the condition.

Additionally, or alternatively, the condition can be that one or more strings of the search query can be substituted with one or more words. For example, in a case where the search query includes the text "james rd," server device 230 can determine that the string 'rd,' of the search query, can be substituted with the word "road," and thus satisfies the condition. In some implementations, one or more other strings can satisfy the condition—e.g., 'ave' (or 'av') can be substituted with the word "avenue," 'ct' can be substituted with the word "court," 's' (or 'so') can be substituted with the word "south," 'n' (or 'no') can be substituted with the word "north," 'e' can be substituted with the word "east," 'w' can be substituted with the word "west," 'mt' can be substituted with the word "mount," 'ft' can be substituted with the word "fort," 'VA' can be substituted with the word "Virginia," 'US' can be substituted with the words "United States," and/or the like.

Additionally, or alternatively, the condition can be that one or more strings of the search query include one or more symbols (e.g., parentheses, brackets, and/or the like), or designator(s) (e.g., a post office box designator (e.g., "PO BOX") and/or number, an apartment designator (e.g., "apt") and/or number, a suite designator (e.g., "suite" or "ste") and/or number, a unit designator and/or number, and/or the like), that suggest that the one or more strings are optional to the search. For example, in a case where the search query includes the text "(I-10)," server device 230 can determine that the string '(I-10),' of the search query, is optional to the search, and thus satisfies the condition. As another example, in a case where the search query includes the text "PO BOX 1234," server device 230 can determine that the strings 'PO,' 'Box,' and '1234,' of the search query, are optional, and thus satisfy the condition.

Additionally, or alternatively, a condition can be that one or more strings of a search query include an alias of a word or a name. For example, in a case where the search query includes the text "sanfran, california," server device 230 can determine that a string 'sanfran,' of the search query, might be an alias of, or a colloquial term for, "San Francisco," and thus satisfies the condition.

In some implementations, server device 230 can compare one or more strings parsed from the search query and one or more predefined strings relating to one or more of the conditions described above to determine whether one or more condition(s) are satisfied.

Although some implementations are described herein with respect to addresses based in the United States and/or conditions relating to strings that contain portions of addresses based in the United States, the implementations apply equally to addresses based in other countries and/or jurisdictions. In such cases, different strings and/or related conditions can be defined, depending on the language (and/or the naming convention(s)) that is used.

In this way, server device 230 can determine whether one or more of the strings satisfy a condition to cause server device 230 to generate, using the strings, a query graph, or to generate, using the strings, a query graph that includes one or more paths relating to the condition.

As further shown in FIG. 4, if one or more of the strings satisfy the condition (block 430—YES), process 400 can include generating, using the strings, a query graph that includes one or more paths relating to the condition (block 440). For example, server device 230 can generate (e.g., using processor 320 and/or the like), using the strings, a query graph that includes one or more paths relating to the condition. In some implementations, server device 230 can generate thousands, millions, billions, etc. of query graphs based on strings parsed from search queries. In this way, server device 230 can generate query graphs, based on strings parsed from search queries, in a manner that cannot be performed manually or objectively by a human actor.

In some implementations, the query graph can be a directed acyclic graph that begins with a root node, which leads to one or more subsequent nodes via one or more transitions, and that ultimately ends at one or more terminal nodes, where no loops exist in the query graph. A node that transitions to another node can be referred to as a parent node, and a node that is transitioned to from another node (e.g., a parent node) can be referred to as a child node. In some implementations, server device 230 can use such a query graph to direct or guide the search process, by traversing the query graph from node to node (e.g., by searching the string contained in each node for a match in a data structure).

In some implementations, a node can contain a string that is parsed from the search query. For example, in a case where the search query includes the text "main street new york," server device 230 can generate a query graph that includes a first node containing the string 'main,' a second node containing the string 'street,' a third node containing the string 'new,' and a fourth node containing the string 'york.'

In some implementations, a node can be empty (e.g., can contain an empty label). For example, in a case where the search query includes the text "s main," server device 230 can generate a query graph that includes a node containing the character 's,' a node containing an empty label, and a node containing the string 'main,' to address the possibility that there exists an entry "s main," as a street name, in a data structure. Additionally, or alternatively, and in some implementations, server device 230 can generate a query graph that includes one or more nodes containing strings that might not be included in the search query, but that can potentially be useful to search. Continuing the previous example, server device 230 can additionally, or alternatively, generate a query graph that includes a node containing the character 's,' and a node containing the string 'outh' (e.g., in a path of the query graph that is different than a path of the query graph that includes the node containing the empty label).

In some implementations, the query graph can include one or more types of transitions that indicate, e.g., to server device 230, during the search process, whether nodes, e.g., associated with a transition, contain strings that belong to the same word, to different words, and/or to different words that correspond to different categories of data in the data structure.

In some implementations, the query graph can include one or more intra-token transitions (i.e., a transition from a node containing a string that includes one or more letters of a word to a node containing a string that includes one or more other letters of the same word). For example, in a case where the search query includes the text "s main," and where server device 230 generates a query graph that includes a node containing the string 's' and a node containing the string 'outh' (e.g., for the possibility that the string 's' is an abbreviation of the word "south"), server device 230 can include an intra-token transition between the two nodes. In this way, server device 230 can determine, when traversing the query graph during the search process, that both nodes correspond to the same word (i.e., 's'+'outh'="south"), and thus the search for the strings 's' and 'outh' should be a search for the word "south."

In some implementations, the query graph can include one or more category transitions (i.e., a transition from a node containing a string that corresponds to one category of data in a data structure to a node containing a string that corresponds to another category of data in the data structure). For example, in a case where the search query includes the text "main street, cleveland," and where server device 230 generates a query graph that includes a node containing the string 'street' and a node containing the string 'cleveland,' server device 230 can include a category transition between the two nodes. In this way, server device 230 can determine, when traversing the query graph during the search process, that, after an entry "main street" is located in the data structure, searching of the street name category of data in the data structure is complete, and thus searching of the node containing the string 'cleveland' should be performed with respect to another category of data in the data structure (e.g., the search for 'cleveland' can be in one of the geographic region name categories of data in the data structure).

In some implementations, the query graph can include one or more token transitions (i.e., a transition from a node containing a string that includes one or more letters of one word to a node containing a string that includes one or more letters of a different word). For example, in a case where the search query that includes the text "main street," and where server device 230 generates a query graph that includes a node containing the string 'main' and a node containing the string 'street,' server device 230 can include a token transition between the two nodes. In this way, server device 230 can determine, when traversing the query graph during the search process, that, after an entry "main" is located in the street name category of data in the data structure, searching of the street name category of data is not yet complete (e.g., if "main," as a complete street name, is not found), and thus searching of the node containing the string 'street' should remain in the street name category of data (e.g., the search for 'street' should not proceed to any other category of data, such as one of the geographic region name categories of data).

In some implementations, server device 230 can, depending on interim results obtained during the search process, determine that a token transition should be treated as a category transition. For example, in a case where the search query includes the text "wayne st paul," and where server device 230 generates a query graph that includes a node containing the string 'wayne,' a node containing the character 's' (that leads to different paths, e.g., Paths A and B, as described above with respect to FIG. 1B), and a token transition between the two nodes, server device 230 can, during the search process, obtain an interim result indicating that "Wayne," as a complete street name, does in fact exist in the data structure. In this case, and despite there being no delimiter included in the search query (e.g., there being no comma between "wayne" and "st paul" in the search query), server device 230 can determine, when traversing the query graph during the search process, that the token transition, between the node containing the string 'wayne' and the node containing the character 's,' is an implicit category change, and thus the node containing the character 's' can be searched in another category of data in the data structure (e.g., in one of the geographic region name categories of data in the data structure).

In some cases, the search query can include text that skips categories of data. For example, in a case where the data structure contains an entry "Wayne Rd, Westland, Mich.," and where the search query includes the text "wayne rd michigan," server device 230 can, after determining that there exists an entry "Wayne Rd" in the data structure, skip one or more categories of data in the data structure during the search, and search for matches in one or more other categories (e.g., a subsequent category) of data (e.g., a geographic region name category of data for states in the United States). In some implementations, server device 230 can process a search query that includes text, relating to certain categories of data, in one or more positions within the search query. For example, server device 230 can permit a search query that includes text, relating to a postal code, at any position after text relating to the street name (e.g., between text relating to the city and text relating to the state, after text relating to the state, etc.).

In some implementations, and as described elsewhere herein, server device 230 can determine that one or more strings, parsed from the search query, satisfy one or more conditions. In such a case, server device 230 can generate a query graph that includes one or more nodes and/or paths based on the condition(s).

In some implementations, and as described above with respect to block 430, server device 230 can determine that one or more strings of the search query might render the search query ambiguous. For example, in a case where the search query includes the text "wayne st paul," server device 230 can determine that the string 'st,' of the search query, might correspond to the street name category of data in the data structure (e.g., the string 'st' can be an abbreviation for "street" and be part of a street name (e.g., "Wayne Street")), or alternatively, to one of the geographic region name categories of data in the data structure (e.g., the string st' can be an abbreviation for "saint" and be part of a geographic region name (e.g., "Saint Paul")). In this case, server device 230 can generate a query graph that includes multiple paths (e.g., that includes Paths A and B shown in FIG. 1B) with one or more (e.g., substitute) nodes (e.g., nodes 153-157 shown in FIG. 1B), that might be constrained to certain categories of data in the data structure, to address the various possibilities.

In some implementations, and as described above with respect to block 430, server device 230 can determine that one or more strings of the search query can be substituted with one or more words. For example, in a case where the search query includes the text "nashville tn," server device 230 can determine that the string 'tn,' of the search query, can be substituted with the word "Tennessee." In this case, server device 230 can generate a query graph that includes a node containing the character 't' and which leads to multiple paths (e.g., via intra-token transition(s))—e.g., one path that includes a node containing the character 'n' (e.g., for the possibility that there exists an entry "tn" in the data structure), and another path that includes a node containing the string 'ennessee' (e.g., for the possibility that there exists an entry "Tennessee" in the data structure).

Figure 5:
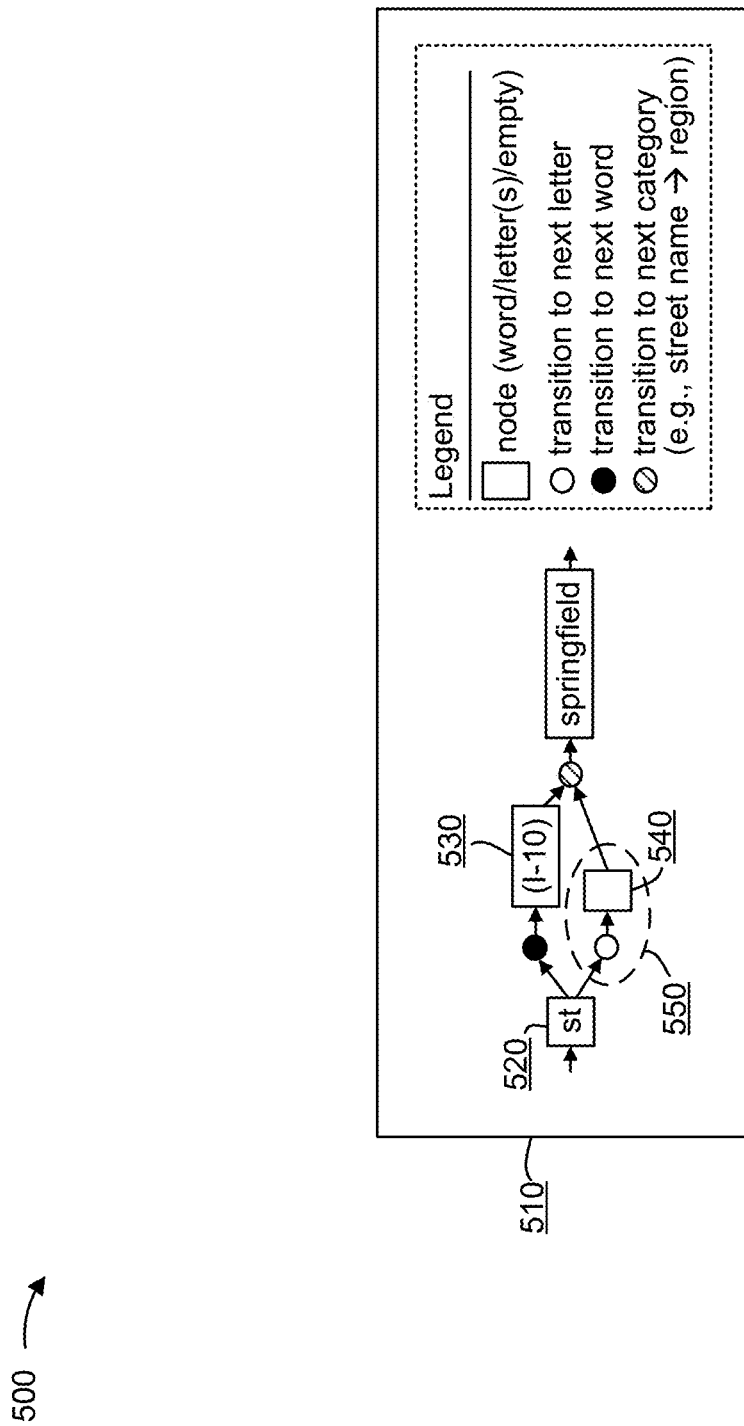
FIGS. 5-7 are diagrams of example implementations relating to the example process shown in FIG. 4.

In some implementations, and as described above with respect to block 430, server device 230 can determine that one or more strings of the search query include one or more symbols (e.g., parentheses, brackets, and/or the like) or designator(s) (e.g., a post office box designator (e.g., "PO BOX") and/or number, an apartment designator (e.g., "apt") and/or number, a suite designator (e.g., "suite" or "ste") and/or number, a unit designator and/or number, and/or the like), that suggest that the one or more strings are optional to the search. For example, in a case where the search query includes the text "(I-10)," and where server device 230 determines that the string '(I-10),' of the search query, is optional to the search, server device 230 can generate a query graph that includes multiple paths—e.g., a first path that includes a node containing the string '(I-10),' and a second path that includes a bypass node (e.g., an empty node). An example implementation is shown in FIG. 5, and described in more detail below.

Figure 6:
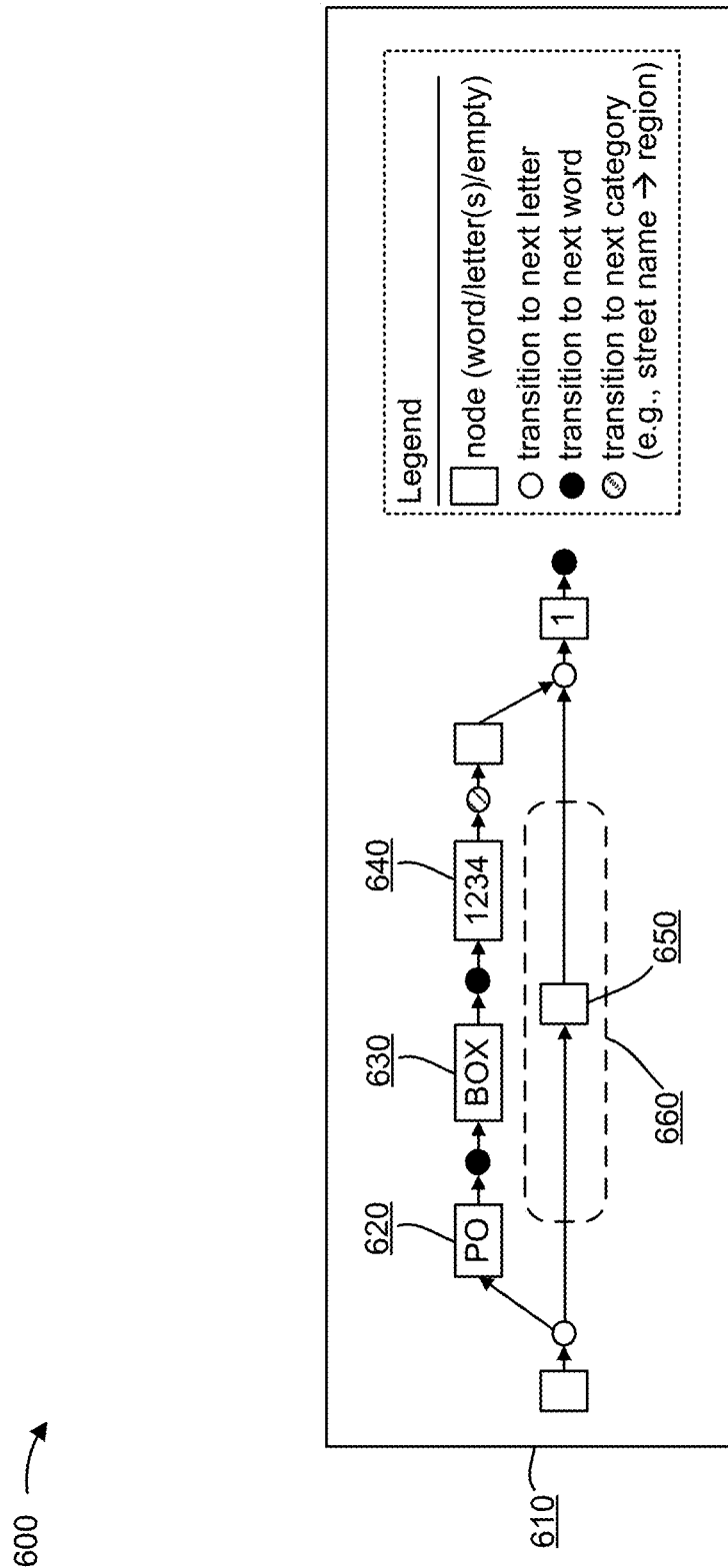

As another example, in a case where the search query includes the text "PO BOX 1234," and where server device 230 determines that strings 'PO,' 'Box,' and '1234,' of the search query, are optional to the search, server device 230 can generate a query graph that includes multiple paths— e.g., a first path that includes one or more nodes containing the strings 'PO,' 'BOX,' and '1234,' and a second path that includes a bypass node (e.g., an empty node). An example implementation is shown in FIG. 6, and described in more detail below.

In some implementations, server device 230 can traverse both a bypass node/path and the path that includes the node(s) containing optional string(s). Traversal of the path that includes the node(s) containing optional string(s) can potentially yield results (e.g., in a case where the optional string(s) are actually included in the data structure), and traversal of the bypass node/path can potentially yield results that would have otherwise been missed (e.g., in a case where the optional string(s) are not included in the data structure). In some implementations, in a case where traversal of the bypass node/path yields higher quality results than results found based on traversal of one or more other paths, and where the higher quality results would have otherwise been missed, the search might end earlier, which can reduce the search space, increase the efficiency of the search, and conserve processing and/or memory resources.

In some implementations, in a case where traversal of a path of a query graph (e.g., an alternate path including substitute node(s)) yields higher quality results than results found based on traversal of one or more other paths of the query graph, and where the higher quality results would have otherwise been missed, the search might end earlier, which can reduce the search space, increase the efficiency of the search, and conserve processing and/or memory resources.

In some implementations, and as described above with respect to block 430, server device 230 can determine that one or more strings of the search query include an alias of a word or a name. For example, in a case where the search query includes the text "sanfran, california," and where server device 230 determines that the string 'sanfran,' of the search query, might be an alias of, or a colloquial term for, "San Francisco," server device 230 can generate a query graph that includes multiple paths—e.g., one path that includes a node containing the string 'sanfran' (e.g., for the possibility that there exists an entry "sanfran" in the data structure), and another path that includes one or more nodes containing the strings 'San' and 'Francisco' (e.g., for the possibility that there exists an entry of the actual name of the city, i.e., "San Francisco," in the data structure).

In some implementations, server device 230 can determine whether one or more strings parsed from the search query might correspond to a postal code format (e.g., of the applicable country for the search). In a case where server device 230 determines that one or more of the strings might correspond to the postal code format, server device 230 can perform one or more preliminary searches (e.g., one or more lookup operations and/or the like) based on the one or more strings that might correspond to the postal code format, generate a query graph that includes an original path that includes node(s) containing the one or more strings and an alternate path containing node(s) storing information obtained from the preliminary search(es) (e.g., metadata, which can include location information), and associate an indicator (e.g., a flag), with the alternate path that indicates that the alternate path is applicable only to the postal code category of data in the data structure. Server device 230 can traverse both the original path and the alternate path. In a case where a priority queue is utilized in the search, as described in more detail below with respect to block 460 and FIGS. 8A-8C, the information contained in the node(s) of the alternate path can be stored in search nodes (e.g., subsequent search nodes) relating to the alternate path after server device 230 traverses the node(s) in the alternate path. In some implementations, including the original path in the query graph can permit searching of the one or more strings against one or more other categories of data of the data structure (e.g., the street number category of data, one of the geographic region name categories of data, and/or the like). This can be applicable for countries that utilize postal code formats that include letters and numbers (e.g., the United Kingdom), since string(s) in a search query that might correspond to the postal code format can, for example, correspond to the prefix of a postal code or to the prefix of a geographic region name. In addition, this can be applicable for countries where street numbers follow street names, since string(s) in a search query that might correspond to the postal code format can, for example, correspond to a postal code or to a street number.

In this way, server device 230 can avoid having to perform repeated postal code lookups during the search process (e.g., during traversal of the query graph).

In some implementations, server device 230 can determine whether one or more of the strings parsed from the search query might correspond to a street number, a unit number (e.g., an apartment number, a suite number, and/or the like, such as 'unit 1,' 'u 1,' or '1/'), and/or the like. In a case where server device 230 determines that one or more of the strings might correspond to a street number, a unit number, and/or the like, server device 230 can generate a query graph that includes an original path that includes node(s) containing the one or more strings and an alternate path containing node(s) storing information (e.g., metadata) indicating that the node(s) correspond to a street number, a unit number, and/or the like, and associate an indicator (e.g., a flag) with the alternate path that indicates that the alternate path is applicable only to the street number category of data in the data structure, the unit number category of data in the data structure, and/or the like. Here, for example, server device 230 can parse the one or more strings and simply store metadata, in the node(s) of the alternate path, specifying the appropriate information (e.g., "Unit 1" as corresponding to the unit number category of data). Server device 230 can traverse both the original path and the alternate path. In some implementations, including the original path in the query graph can permit searching of the one or more strings against one or more other categories of data of the data structure. In some implementations, server device 230 can, in cases where strings parsed from the search query might correspond to a postal code, a street number, a unit number, and/or the like, generate a query graph that includes an original path and an alternate path, as described above, since primary indexes for such categories of data might not be available in the data structure. Thus, server device 230 can search for results based on street names, geographic region names, etc., and subsequently use stored information (e.g., stored in search nodes) to perform validation on results later and/or to store on results (e.g., a result might preserve unit information specified in the search query even where unit information might not be available in the data structure). In a case where the data structure is indexed on different categories of data, server device 230 can generate a query graph to include alternate paths and associated node(s) for different categories of data in the data structure.

In some implementations, server device 230 can associate a cost with one or more nodes and/or one or more paths of the query graph. In some implementations, the cost can be set or configured by a user (e.g., a system administrator), server device 230, and/or another device, such as a client device 220, a vehicle 210, and/or another server device. In some implementations, a cost associated with a node and/or a path of the query graph can provide an indication as to a quality (e.g., a measure of quality) of results that is likely to be obtained from traversal of such a node and/or such a path. In some implementations, a lower cost can indicate a higher likelihood that satisfactory results will be obtained. Alternatively, and in some implementations, a higher cost can indicate a higher likelihood that satisfactory results will be obtained.

In some implementations, server device 230 can utilize a cost associated with a node and/or a path of the query graph to guide the search process. For example, server device 230 can choose to traverse one or more paths of the query graph, but not one or more other path(s) of the query graph, depending on the cost(s) associated with the various paths. Continuing the example, server device 230 can be discouraged from traversing a path associated with a higher cost. As another example, server device 230 can determine whether to end the search based on an accumulated cost (e.g., costs accumulated from traversal of the various nodes and/or paths of the query graph). Continuing the example, in a case where an accumulated cost satisfies (e.g., is greater than or equal to) a threshold, server device 230 can end the search, and provide any results, obtained until that point, as a response to the search query.

As one example of associating costs with nodes and/or paths, in a case where the search query includes the text "(I-10)," and where server device 230 generates a query graph that includes multiple paths—e.g., a first path that includes a node containing the string '(I-10),' and a second path that includes a bypass node (e.g., as described above)—server device 230 can associate a higher cost with the bypass node (and/or with the second path) than with the node containing the string '(I-10)' (and/or with the first path), since result(s) that match the string '(I-10)' might be preferred given that '(I-10)' is the exact text in the search query.

As another example, in a case where the search query includes the text "sanfran, california," and where server device 230 generates a query graph that includes multiple paths—e.g., a first path that includes a node containing the string 'sanfran,' and a second path that includes one or more nodes containing the strings 'San' and 'Francisco' (e.g., as described above)—server device 230 can associate a lower cost with the node containing the string 'sanfran' (and/or with the first path) than with the node(s) containing the strings 'San' and 'Francisco' (and/or with the second path), since an entry "sanfran" in the data structure would match the string 'sanfran' of the search query exactly, and thus might be a more satisfactory result than a match for the colloquial substitute "San Francisco." This can be useful in a case where a term in a search query might actually be the proper name of a particular location as well as a colloquial term for a different location.

In some implementations, and in a case where the search query includes a common misspelling of a location name, server device 230 can generate a query graph that includes multiple paths—e.g., a first path that includes a node containing the misspelled word, and a second path that includes one or more nodes containing the actual location name (e.g., similar to the example described above where the search query includes the text "sanfran"), and can associate a lower cost with the node containing the misspelled word (and/or with the first path) than with the node(s) containing the actual location name (and/or with the second path).

In this way, server device 230 can associate costs with nodes and/or paths of a query graph, and utilize the costs, during the search process, to prioritize and/or deprioritize traversal and/or searching of certain nodes and/or paths of the query graph.

In some implementations, server device 230 can associate one or more constraints with one or more nodes and/or paths of the query graph, as described elsewhere herein. In some implementations, server device 230 can generate a query graph that includes information, associated with a node, that indicates one or more categories of data in a data structure to which the node is applicable.

As one example, and as described above with respect to FIGS. 1A-1C, in a case where the search query includes the text "wayne st paul," and where server device 230 generates a query graph that includes multiple paths—e.g., that includes Paths A and B—with one or more nodes (e.g., nodes 153-157), server device 230 can constrain searching of one or more of the nodes to particular categories of data in the data structure.

As another example, for U.S.-based addresses, server device 230 can constrain searching of certain substitute node(s) to a state name category of data. Continuing the example, in a case where a search query includes the text "in, Pennsylvania," and where server device 230 generates a query graph that includes a substitute node containing the string 'indiana' and constrained to the state name category of data, server device 230 might not search such a substitute node when the search is in a different category of data, such as street names, cities, etc., in which case server device 230 might not obtain "Indiana, Pennsylvania" as a result.

In some implementations, the query graph can include information regarding where, within a category of data in the data structure, a node is applicable. For example, server device 230 can restrict searching of a substitute node containing the string 'aint' (e.g., corresponding to a substitute "saint" for the string st' in a search query) to the beginning of a geographic region name, rather than anywhere within a geographic region name. As another example, server device 230 can permit searching of substitute nodes corresponding to strings, such as 'st,' 'rd,' 'ave,' and/or the like only after at least one word in the street name has been matched in the data structure. Other categories of data, to which server device 230 can define node applicability, can include a postal code category of data, a street number category of data, a unit number category of data, and/or the like.

In some implementations, server device 230 can associate a constraint, by including (e.g., encoding) information regarding the constraint (e.g., in the form of flag(s) and/or the like) in one or more nodes of the query graph (and/or in one or more corresponding search nodes, such as in a case where a priority queue is utilized in the search, as described in more detail below with respect to block 460 and FIGS. 8A-8C).

Although some implementations are described herein with respect to addresses based in the United States and/or costs and/or constraints relating to nodes/strings that contain portions of addresses based in the United States, the implementations apply equally, or similarly, to addresses based in other countries and/or jurisdictions. In such cases, different strings and/or related costs and/or constraints can be defined, depending on the language (and/or naming convention(s)) that is used.

In some implementations, server device 230 can add, or include, to the query graph, one or more container nodes (e.g., placeholder, or lazy, nodes) that can be traversed if interim results obtained during the search (e.g., obtained from traversing and/or searching one or more nodes of the query graph) are unsatisfactory. In some implementations, a container node can serve as a terminal node. In some implementations, a container node can be included in a query graph, during generation of the query graph. Alternatively, a container node can be added to a query graph after the query graph has already been generated.

In some implementations, a container node can be associated with a cost. For example, server device 230 can associate a higher cost with a container node (e.g., to discourage traversal thereof, unless needed, such as in a case where interim search results obtained during the search are unsatisfactory).

Figure 7:
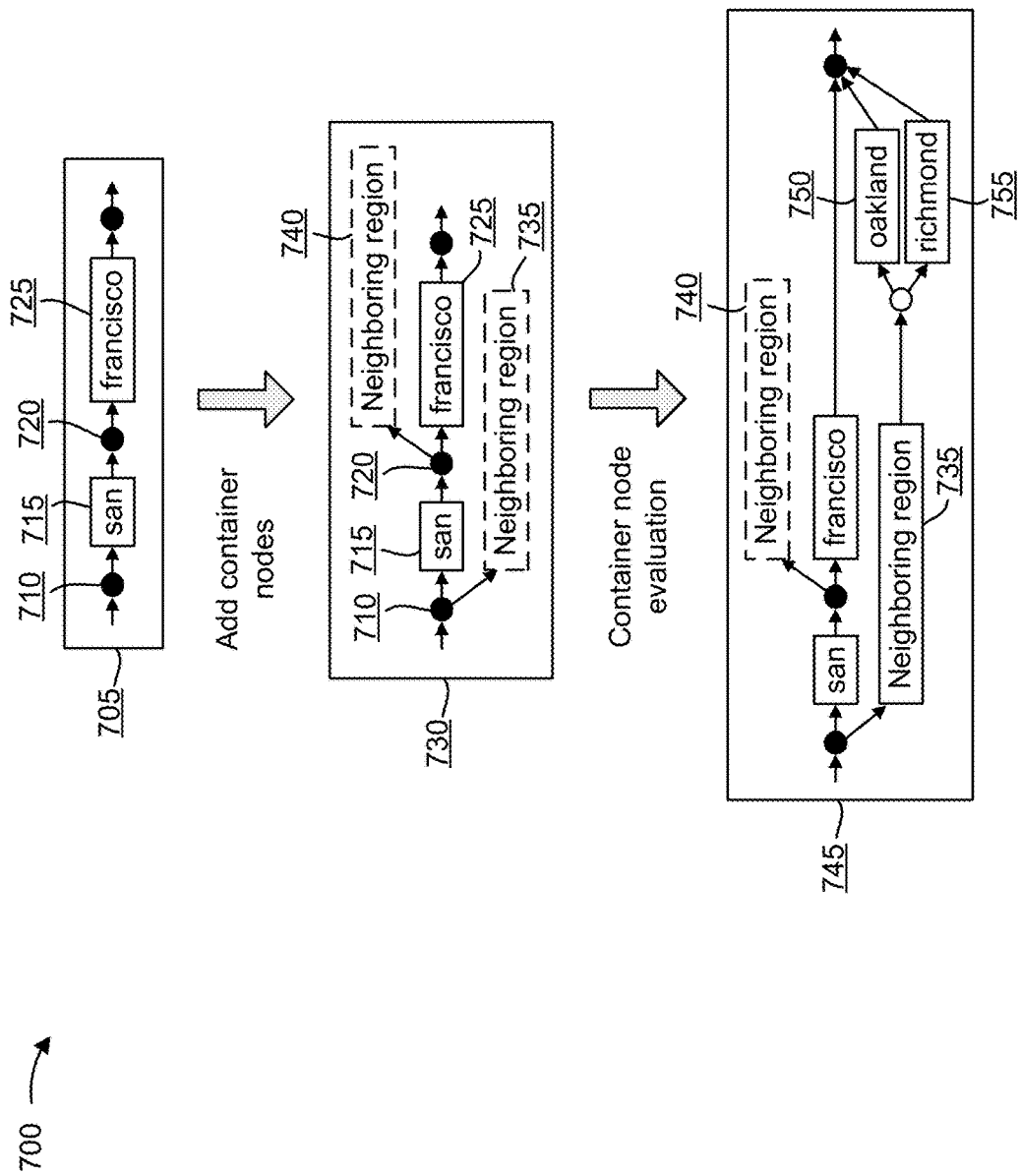

In some implementations, container nodes can be added, or included, to some or all of the token transitions of a query graph, and thus be associated with one or more nodes that are associated with those transitions. In a case where server device 230 does not traverse a container node, the container node can remain as-is in the query graph. In contrast, in a case where server device 230 traverses a container node, the traversal can cause a supplementary search to be performed (e.g., by server device 230 and in the same or a different data structure) for data or information related to one or more of the node(s) associated with the container node. For example, where one of the nodes contains a string that identifies a particular geographic region, traversal of an associated container node can cause a supplementary search to be performed for one or more nearby, or neighboring, geographic regions. Continuing the example, where data or information regarding one or more nearby, or neighboring, geographic regions is found, server device 230 can include such data or information in one or more new, child nodes, of the container node. Further continuing the example, server device 230 can continue the search process, by traversing one or more of the child node(s), to potentially obtain satisfactory results. An example implementation is shown in FIG. 7, and described in more detail below.

In some implementations, server device 230 can perform the addition, substitution, and/or inclusion of nodes in a query graph (as described above with respect to various examples), during generation of the query graph, or alternatively, after generating the query graph. For example, in a case where the search query includes the text "st," server device 230 can first generate a query graph that includes a node containing the string 'st,' and subsequently substitute that node with a node that contains the character 's' and a node that contains the character 't.' Alternatively, server device 230 can, during generation of the query graph, include a node containing the character 's' and a node containing the character 't,' without first storing the string st' in a node of the query graph.

In some implementations, server device 230 can add or include one or more indicators (e.g., flags), to the query graph, that identify nodes and/or associated paths that are part of the original query graph (i.e., those nodes and/or paths that are based strictly on the strings parsed from the search query) and nodes and/or associated paths that were added or substituted. For example, in a case where the search query includes the text "rd," server device 230 can generate a query graph that includes a node containing the character 'r,' a first path that includes a first child node containing the character 'd,' and a second path that includes a second child node containing the string 'oad,' and can add one or more indicators that specify the first path as being an original path of the query graph, and the second path as being an additional path. In some implementations, server device 230 can, based on the one or more indicators, permit matches of the node containing the character 'r' and the first child node containing the character 'd' to entries in the data structure that include similar strings (e.g., "re"), but can prevent matches of the second child node containing the string 'oad' to entries in the data structure that include similar strings (e.g., "roam"), since the second child node is not in an original path and is not similar to the string 'rd' parsed from the search query.

As further shown in FIG. 4, if one or more of the strings do not satisfy the condition (block 430—NO), process 400 can include generating, using the strings, a query graph (block 450). For example, server device 230 can generate (e.g., using processor 320 and/or the like), using the strings, a query graph. In some implementations, the query graph can be a simpler version of the query graph described above with respect to block 440. For example, the query graph can lack paths relating to the various conditions described above with respect to block 440. In some implementations, the query graph can include some of the information and/or types of nodes described above with respect to block 440, such as, for example, cost information, bypass node(s), and/or container node(s).

In this way, server device 230 can generate, using the strings, a query graph, or generate, using the strings, a query graph that includes one or more paths relating to the conditions to cause server device 230 to perform one or more actions relating to the query graph to obtain one or more results that correspond to the search query.

As further shown in FIG. 4, process 400 can include performing one or more actions relating to the query graph to obtain one or more results that correspond to the search query (block 460). For example, server device 230 can perform (e.g., using processor 320, memory 330, storage component 340, communication interface 370, and/or the like) one or more actions relating to the query graph to obtain one or more results that correspond to the search query. In some implementations, server device 230 can perform thousands, millions, billions, etc. of actions relating to query graphs. In this way, server device 230 can perform actions relating to query graphs in a manner that cannot be performed manually or objectively by a human actor.

In some implementations, server device 230 can execute a search process that utilizes the query graph (e.g., by traversing the query graph, beginning at a root node of the query graph, and searching the string contained in each traversed node for a match in a data structure) to direct and/or guide the search process. In some implementations, server device 230 can utilize one or more search algorithms in the search process. In some implementations, the one or more search algorithms can include algorithms that perform searches based on exact (direct) matches, fuzzy matching, and/or the like. In some implementations, and in a case where the one or more search algorithms include algorithm(s) that perform searches based on fuzzy matching, the search algorithm(s) can provide support for search queries that include typographical errors (e.g., misspelled words).

In some implementations, the server device can provide a result (e.g., a search result to a user) after the end of a terminal node has been reached (e.g., after the last character of a string contained in a terminal node has been searched and matched in the data structure). In some implementations, the server device can provide such a result only if the end of a terminal node has been reached. In some implementations, server device 230 can validate results obtained from searching terminal node(s) and exclude (e.g., filter) one or more of such results based on one or more criteria. In some implementations, such excluded results might not be counted against condition(s) for ending a search process (e.g., results-count-based condition(s) where a search process can end when a quantity of obtained results satisfies a threshold).

In some implementations, and in a case where there is a mismatch between a string, contained in a node of the query graph being searched, and data in the data structure, server device 230 can discard or reject an associated interim result, and end traversal of the node. In some cases, server device 230 can discard or reject an interim result that corresponds to a node of the query graph and to a first location in the data structure, but permit (e.g., accept) an interim result (e.g., a subsequent interim result) corresponding to the node and to a second location in the data structure. This can occur, for example, in a case where server device 230 searches a node against multiple categories of data. For example, as described above with respect to example implementation 100 shown in FIGS. 1A-1C, in a case where "Wayne" is found as a complete street name in the data structure, node 152 ('s') can be searched against the street name category of data as well as one of the geographic region name categories of data. Continuing the example, and depending on what is contained in the data structure, there might be match(es) corresponding to node 152 for one of the street name category of data and the geographic region name category of data, and mismatch(es) corresponding to the same node 152 for the other category of data, in which case server device 230 can discard or reject the mismatched interim result(s) and accept or permit the matched interim result(s).

In some implementations, server device 230 can permit prefix matching. For example, in a case where the search query includes the text "wayne st pa," and server device 230 generates and traverses a query graph based on such a search query, server device 230 might complete traversal of the query graph before fully searching a geographic region name category (e.g., where entries in the data structure might contain words that include the letters "pa" as well as one or more additional letters). In such a case, server device 230 can provide one or more partial matches in the data structure as results, such as for example, a result "Wayne St, Paul" (e.g., a prefix matched result), a result "Wayne St" or "Wayne Street" corresponding to street(s) located in Pennsylvania (e.g., obtained based on traversal of a node containing the string "Pennsylvania" substituted for the string 'pa' of the search query), and/or the like.

In some implementations, the search process can include the use and/or management of a search queue (e.g., a priority queue) and search nodes. In this case, and as an example, a search node in the search queue can include (or be associated with) a result obtained during the search (e.g., an interim result or a final result) that server device 230 can utilize (e.g., by obtaining the search node from the search queue) to determine how the query graph is to be traversed (e.g., to determine which path(s) of the query graph to traverse) and/or whether the search should end.

In some implementations, each search node can be referenced to a node of the query graph (e.g., a search node in the search queue can be referenced to the root node of the query graph, another search node in the search queue can be referenced to another node of the query graph, etc.). In some implementations, each search node can be referenced to a particular location within a node of the query graph (e.g., to a character of a string contained in a node of the query graph), which can permit server device 230 to keep track of the characters, of a string contained in a node of the query graph, that have already been matched to the data structure (such as, for example, in a case where the data structure is a trie-based data structure). This might be needed, for example, where search nodes corresponding to a particular node in the query graph are associated with different costs (e.g., when fuzzy matching is employed) and prioritized differently in the search queue.

In some implementations, each search node can be associated with a cost. For example, the cost can be associated with the node of the query graph to which the search node is referenced. Additionally, or alternatively, the cost can be associated with a path in the query graph that includes the node to which the search node is referenced. Additionally, or alternatively, the cost can be associated with a time needed to perform a particular search and/or memory resources needed to perform a particular search, and/or the like. In some implementations, server device 230 can obtain an interim result by obtaining, from the search queue, a search node that is associated with the lowest cost. In some implementations, server device 230 can obtain such a search node periodically, continuously, after traversing a node in the query graph, and/or the like.

In some implementations, server device 230 can continue traversing the query graph, and obtaining interim results (e.g., from the search queue) until one or more conditions are satisfied. For example, server device 230 can continue traversing the query graph, and obtaining interim results until some or all of the nodes of the query graph have been traversed (e.g., until server device 230 traverses and/or searches one or more terminal nodes of the query graph, in which case server device 230 can provide (e.g., to a user) result(s) obtained from searching such terminal node(s)), until some or all of the search nodes in the search queue have been obtained, until a threshold quantity of search results has been satisfied (e.g., obtained), until an accumulated cost of the search reaches a maximum permitted cost (or is within a certain amount from the maximum permitted cost), and/or the like.

In some implementations, server device 230 can generate a query graph that includes all relevant paths including all child nodes and associated costs. In some implementations, server device 230 can search some or all of such paths of the query graph. In a case where the cost associated with one child node in one path is high and/or if cost(s) associated with later node(s) on the path are high, server device 230 might simply not further explore that path (e.g., where cost-related conditions and/or other conditions have been satisfied, as described above).

In some implementations, and referring to the example implementation described above with respect to FIGS. 1A-1C, in a case where server device 230 employs fuzzy matching, server device 230 can, despite there being no entry "Wayne" as a complete street name in the database and despite node 157 ('aint') being constrained to a geographic region name category of data, to the beginning of a geographic region name, and/or to the beginning of a street name, nevertheless search for streets containing the name "Wayne" in a region named "Saint Paul" (e.g., for the possibility that there exists an entry such as "Wayne Rd, Saint Paul" and/or the like in the data structure), but can do so by associating a higher cost with corresponding search node(s).

In this way, server device 230 can perform one or more actions relating to the query graph to obtain one or more results that correspond to the search query.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

FIG. 5 is a diagram of an example implementation 500 relating to example process 400 shown in FIG. 4.

As shown in FIG. 5, a portion 510 of a query graph can include a node 520 that contains the string 'st' and a node 530 that contains the string '(I-10).' As described above with respect to block 440 of FIG. 4, server device 230 can determine that the string '(I-10)' is optional to the search (e.g., based on one or more predefined characters, such as parentheses, included in the string), and can include a bypass node 540 in a separate path 550 of the query graph. In some implementations, server device 230 can traverse bypass node 540/path 550 and the path that includes node 530 to potentially obtain results that actually include the optional string and/or results that would otherwise be missed if only the path that includes node 530 (and not bypass node 540/path 550) is traversed. As described above with respect to block 440, a bypass path, such as path 550, can be associated with a higher cost, since result(s) that match the string '(I-10)' might be preferred given that such result(s) would match (e.g., match exactly) the text in the search query.

As indicated above, FIG. 5 is provided merely as an example. Other examples are possible and can differ from what was described with regard to FIG. 5.

FIG. 6 is a diagram of an example implementation 600 relating to example process 400 shown in FIG. 4.

As shown in FIG. 6, a portion 610 of a query graph can include a node 620 that contains the string 'PO,' a node 630 that contains the string 'BOX,' and a node 640 that contains the string '1234.' As described above with respect to block 440 of FIG. 4, server device 230 can determine that the strings 'PO,' 'BOX,' and '1234' are optional to the search (e.g., based on one or more designators included in the string, such as a designator for post office box information), and can include a bypass node 650 in a separate path 660 of the query graph. In this way, server device 230 can traverse both bypass node 650/path 660 and the path that includes nodes 620, 630, and 640 to potentially obtain results that actually include the optional strings and/or results that would otherwise be missed if only the path that includes nodes 620, 630, and 640 (and not bypass node 650/path 660) is traversed. As described above with respect to block 440, a bypass path, such as path 660, can be associated with a higher cost, since result(s) that match the strings 'PO,' 'BOX,' and '1234' might be preferred given that such result(s) would match (e.g., match exactly) the text in the search query.

As indicated above, FIG. 6 is provided merely as an example. Other examples are possible and can differ from what was described with regard to FIG. 6.

FIG. 7 is a diagram of an example implementation 700 relating to example process 400 shown in FIG. 4.

As shown in FIG. 7, a portion 705 of a query graph can include a token transition 710 that leads to a node 715 containing the string 'sari,' and a token transition 720 that leads to a node 725 containing the string 'francisco.' As described above with respect to block 440 of FIG. 4, server device 230 can include a container node at one or more token transitions of a query graph. Here, as shown in FIG. 7, and as shown by reference number 730, a container node 735 can branch from token transition 710, and a container node 740 can branch from token transition 720. Container nodes 735 and 740 can each be set or configured to populate one or more child nodes when the container node is traversed, as described above with respect to block 440 of FIG. 4.

As shown in FIG. 7, and as shown by reference number 745, container node 740 is not traversed, and thus remains as-is. However, container node 735 is traversed, which can cause a supplementary search (e.g., for information regarding neighboring regions) to be performed. Where one or more results are obtained from the supplementary search, server device 230 can, as shown, populate the query graph with child nodes 750 and 755 (e.g., that contain one or more strings corresponding to one or more neighboring regions identified from the supplementary search). Server device 230 can subsequently traverse and/or search child nodes 750 and/or 755. Here, as shown in FIG. 7, child nodes 750 and 755 can redirect back to the query graph, thus permitting server device 230 to continue to traverse a portion, or an entirety, of the remainder of the query graph (not shown). In some implementations, one or more of child nodes 750 and 755 can serve as terminal nodes (e.g., where one or more result(s) can be obtained after the end of child node 750 and/or child node 755 is reached (e.g., after the last character in the string "oakland" contained in child node 750 and/or the last character in the string "richmond" in child node 755 has been searched and matched in the data structure), and the search process can continue until one or more conditions are satisfied (e.g., as described elsewhere herein, such as with respect to block 460 of FIG. 4 above).

As indicated above, FIG. 7 is provided merely as an example. Other examples are possible and can differ from what was described with regard to FIG. 7.

Figure 8A:
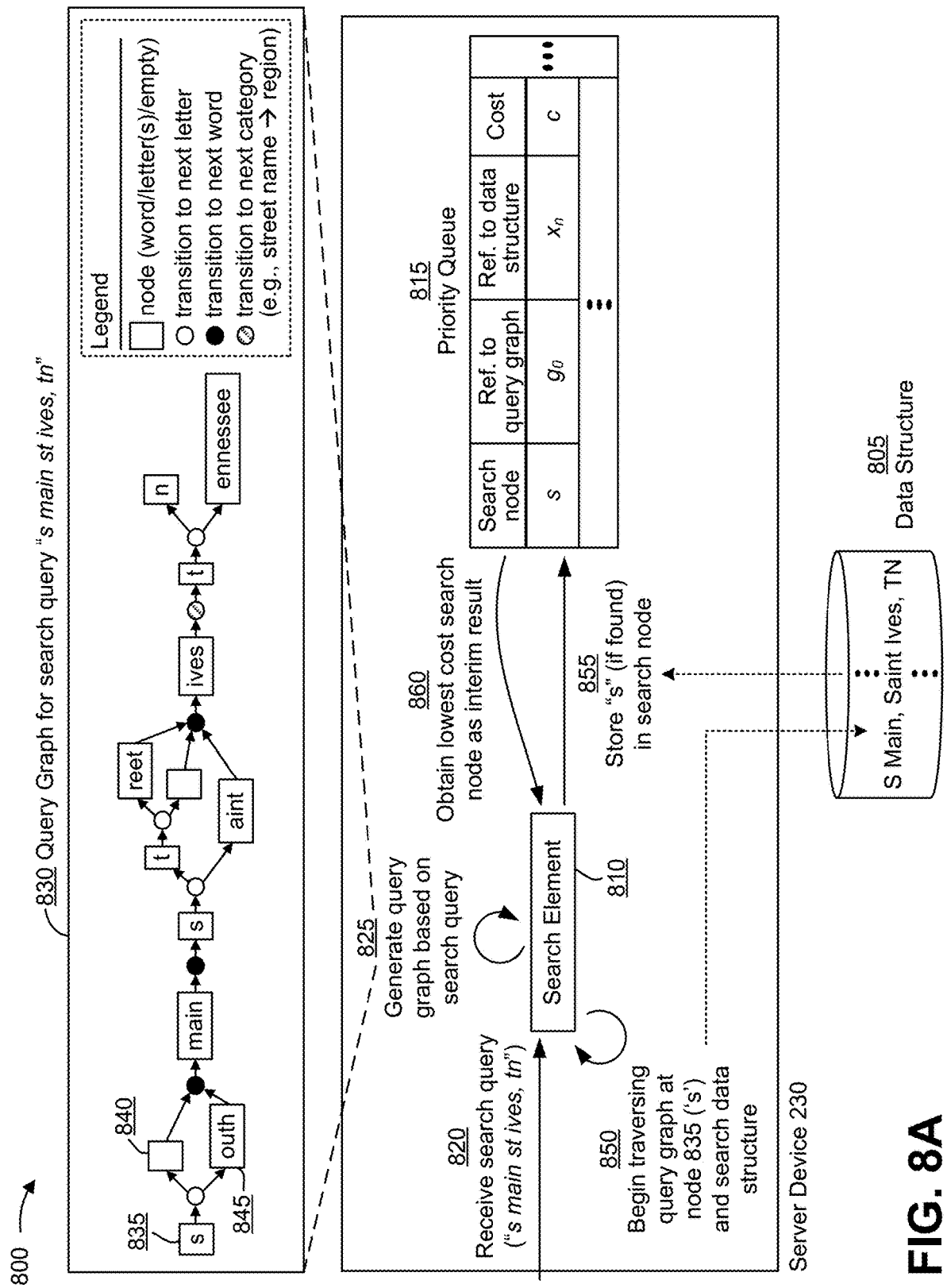
FIGS. 8A-8C are diagrams of an example implementation relating to the example process shown in FIG. 4.
Figure 8B:
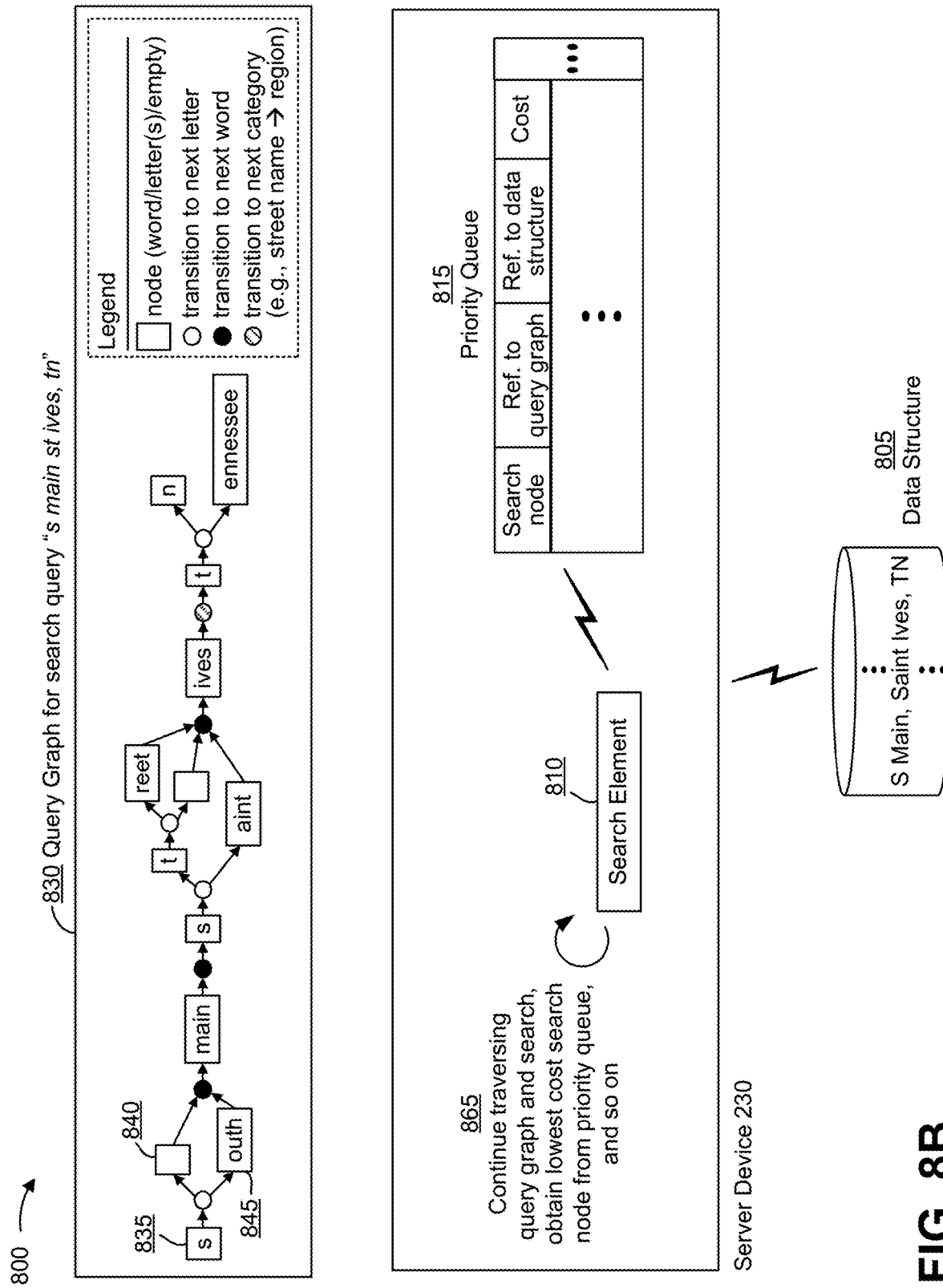
Figure 8C:
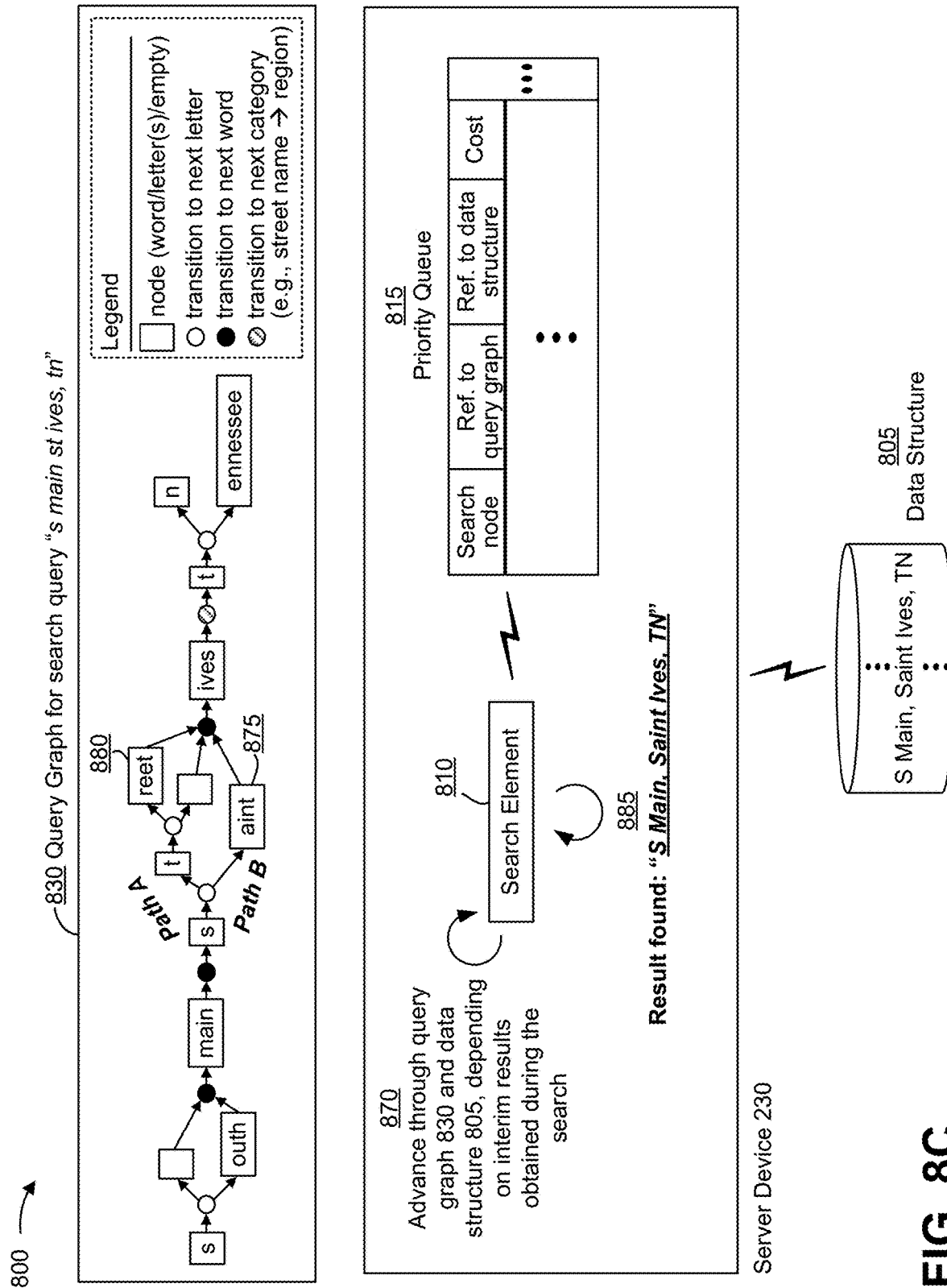

FIGS. 8A-8C are diagrams of an example implementation 800 relating to example process 400 shown in FIG. 4.

As shown in FIGS. 8A-8C, example implementation 800 can include server device 230, and a data structure 805 that stores addresses. As shown, server device 230 can include and/or execute a search element 810 (e.g., a search process and/or algorithm) and a priority queue 815. Although data structure 805 is shown as being separate from server device 230, in some implementations, data structure 805 can be included in server device 230 (e.g., stored in memory in server device 230). In some implementations, data structure 805 can be a trie-based data structure. In this case, search element 810 can be configured (e.g., programmed) to search such a trie-based data structure.

As shown in FIG. 8A, and as shown by reference number 820, search element 810 can receive a search query (i.e., for "s main st ives, tn"). As shown by reference number 825, search element 810 can generate a query graph 830 based on the search query. For example, search element 810 can parse the search query into strings, and generate a query graph based on the parsed strings, as described above with respect to blocks 420-440 of FIG. 4.

As shown, query graph 830 can include nodes and transitions between the nodes. As shown, query graph 830 can begin at a root node 835 containing the character 's,' which transitions to a node 840 containing an empty label and a node 845 containing the string 'outh.' Additional nodes containing other strings are also shown.

As shown by reference number 850, search element 810 can begin searching, by traversing query graph 830, starting at root node 835. For example, search element 810 can search data structure 805 for one or more entries beginning with the character 's.' As shown by reference number 855, search element 810 can store a result of this search in a search node in priority queue 815. Priority queue 815 can store information associated with the search node, including, for example, a reference to the query graph (e.g., to the node of the query graph to which the search node is related (e.g., to a particular location in the node of the query graph, such as a character of a string contained in the node of the query graph)), a reference to a location in data structure 805, and/or cost information. Here, the cost information can include a cost (if any) associated with a path that includes the corresponding node in the query graph, a cost associated with a time needed to perform a particular search and/or memory resources needed to perform a particular search, and/or the like.

As shown by reference number 860, search element 810 can obtain, from priority queue 815, the search node that is associated with the lowest cost as an interim result of the search.

As shown in FIG. 8B, and as shown by reference number 865, search element 810 can continue traversing query graph 830. For example, search element 810 can branch out and search both node 840 and node 845 of query graph 830, traverse and/or search these nodes, obtain, from priority queue 815, a search node that is associated with the lowest cost, and so on.

As shown in FIG. 8C, and as shown by reference number 870, search element 810 can advance through query graph 830 and data structure 805 depending on interim results obtained during the search. In some implementations, and when an option between two or more possible paths—e.g., Path A and Path B (and/or any other paths, since a node can be associated with any quantity of child nodes)—in query graph 830 is reached, search element 810 can traverse none, one, or more of such possible paths (none, for example, if no matches are found at the start of the path). For example, similar to the query graph shown in FIGS. 1B and 1C, and as described above with respect to block 440 of FIG. 4, query graph 830 can include a constraint associated with a node 875 that permits searching of the string 'aint' only in one or more of the geographic region name categories of data and/or to the beginning of a geographic region name (rather than anywhere within a geographic region name), and a constraint associated with node 880 that permits searching of the string 'reet' only in the street name category of data.

In some implementations, search element 810 can traverse other paths of query graph 830 even in a case where, during the search, one path yields satisfactory results. For example, in a case where search element 810 searches a path in query graph 830 in the street name category, and determines that there exists an entry "S Main" as a complete street name in data structure 805, an entry "S Main St" as a complete street name in data structure 805, an entry "S Main Street" as a complete street name in data structure 805, an entry "South Main" as a complete street name in data structure 805, an entry "South Main St" as a complete street name in data structure 805, or an entry "South Main Street" as a complete street name in data structure 805, search element 810 can additionally traverse one or more other paths in query graph 830 to search others of such possible street names. Exploring the various paths of a query graph (e.g., that correspond to various search possibilities relating to the search query) in such a manner permits search element 810 to potentially obtain results that correspond to each of such paths, without having to explicitly search all possible interpretations of a search query individually. This might not be possible with other search techniques that make assumptions regarding data category boundaries in a search query at the outset.

Here, search element 810 can obtain an interim result that indicates that there exists an entry "S Main," as a complete street name, in data structure 805. Search element 810 can then continue the search, and, as shown by reference number 885, obtain a final result indicating that there exists an entry "S Main, Saint Ives, Tenn." in data structure 805. Here, data structure 805 does not contain any of the entries "S Main St," "S Main Street," "South Main," "South Main St," and "South Main Street" as a complete street name, and thus search element 810 does not provide any of such entries as a result.

As indicated above, FIGS. 8A-8C are provided merely as examples. Other examples are possible and can differ from what was described with regard to FIGS. 8A-8C. Although some implementations were described with respect to a trie-based data structure and search algorithm(s) configured to search such a structure, the implementations described herein apply equally, or similarly, to other types of data structures and search algorithm(s). Some implementations, described herein, can be applied in an autocomplete search system and/or environment, and/or the like.

Some implementations, described herein, provide a device (e.g., server device 230) that is capable of resolving ambiguities in a search query during the search process. In some implementations, as described herein, the device is capable of generating, based on a search query, a query graph that includes multiple paths with corresponding nodes that relate to different search possibilities, and providing a search process that utilizes the query graph to direct and/or guide the search. In some implementations, one or more of the nodes can each be associated with a constraint that restricts searching of the node to one or more categories of data in a data structure, to a particular location in one or more categories of data in the data structure, and/or the like. In some implementations, the search process can traverse the query graph, beginning at a root node of the query graph, to identify matches in the data structure, and advance through the query graph (e.g., through one or more of the multiple paths and corresponding nodes) and through the data structure (e.g., through various categories of data in the data structure) based on interim result(s) obtained from the data structure (e.g., based on matches against the data in the data structure). This permits the search process to disambiguate between search query interpretations as matches are found in the data structure during the search, which reduces or eliminates a need to make assumptions regarding the possible interpretations of a search query at the outset (thereby yielding more satisfactory results), and reduces or eliminates a need to explicitly search each such possible interpretation. This reduces the search space and increases the efficiency of the search (thereby reducing a time needed to perform the search and conserving processing and/or memory resources of the device). Furthermore, this reduces or eliminates a need for a user to expend additional time on the search system, which permits users to receive search results much more quickly, reduces network traffic to and from the device, and increases the overall operational speed of the device and the network.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Certain user interfaces have been described herein and/or shown in the figures. A user interface can include a graphical user interface, a non-graphical user interface, a text-based user interface, and/or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
     receive a search query,
       the search query relating to a geographic location;
     process the search query to parse the search query into a plurality of strings,
       the plurality of strings including text;
         determine that one or more strings, of the plurality of strings, satisfy a condition, wherein the one or more processors, when determining that the one or more strings satisfy the condition, are to determine that the one or more strings render the search query ambiguous;

generate, using the plurality of strings, a query graph that includes a plurality of paths relating to the condition,
the query graph being a directed acyclic graph and including:
a plurality of nodes leading to and/or included in the plurality of paths,
each node, of the plurality of nodes, corresponding to a category of data, of a plurality of categories of data, in a data structure, and
a plurality of transitions between the plurality of nodes wherein each transition, of the plurality of transitions, is associated with at least one letter or a word, and
wherein a transition, of the plurality of transitions, is associated with adding a letter to the one or more strings in a subsequent node of the query graph such that the subsequent node resolves the ambiguous search query; and
perform one or more actions relating to the query graph to obtain, from the data structure, one or more search results that correspond to the search query.

2. The device of claim 1, where the one or more processors, when processing the search query to parse the search query into the plurality of strings, are to process the search query to parse the search query into the plurality of strings based on one or more delimiters.

3. The device of claim 2, where the one or more delimiters include a space character or a comma.

4. The device of claim 1, where the one or more processors, when determining that the one or more strings satisfy the condition, are to determine that the one or more strings are substitutable with one or more other strings.

5. The device of claim 1, where the one or more processors, when determining that the one or more strings satisfy the condition, are to determine that the one or more strings are optional.

6. The device of claim 1, where the plurality of categories of data include a street name category of data and one or more geographic region name categories of data.

7. The device of claim 1, where the one or more processors, when performing the one or more actions, are to utilize the query graph to guide a search process to obtain the one or more search results.

8. A non-transitory computer-readable medium storing instructions, the instructions comprising:
one or more instructions that, when executed by one or more processors, cause the one or more processors to:
receive a search query,
the search query relating to a geographic location;
process the search query to parse the search query into a plurality of strings,
the plurality of strings including text;
determine that one or more strings, of the plurality of strings, satisfy a condition,
wherein the one or more instructions that cause the one or more processors to determine that the one or more strings satisfy the condition cause the one or more processors to determine that the one or more strings render the search query ambiguous;
generate, using the plurality of strings, a query graph that includes a plurality of paths relating to the condition,
the query graph being a directed acyclic graph, and further including:
a plurality of nodes leading to and/or included in the plurality of paths,
each node, of the plurality of nodes, corresponding to a category of data, of a plurality of categories of data, in a data structure, and
a plurality of transitions between the plurality of nodes,
wherein each transition, of the plurality of transitions, is associated with at least one letter or a word, and
wherein a transition, of the plurality of transitions, is associated with adding a letter to the one or more strings in a subsequent node of the query graph such that the subsequent node resolves the ambiguous search query; and
perform one or more actions relating to the query graph to obtain, from the data structure, one or more search results that correspond to the search query.

9. The non-transitory computer-readable medium of claim 8, where the one or more instructions, that cause the one or more processors to receive the search query, cause the one or more processors to receive the search query based on one or more selections by a user of a client device.

10. The non-transitory computer-readable medium of claim 8, where the one or more instructions, that cause the one or more processors to perform the one or more actions, cause the one or more processors to:
utilize the query graph to guide a search process to obtain the one or more search results.

11. The non-transitory computer-readable medium of claim 8, where a first node, of the plurality of nodes, contains a first portion of a string, of the one or more strings, and where a second node, of the plurality of nodes, contains a second portion of the string.

12. The non-transitory computer-readable medium of claim 11, where a third node, of the plurality of nodes, contains a string that is not included in the plurality of strings.

13. The non-transitory computer-readable medium of claim 12, where the first node leads to a first path, of the plurality of paths, and a second path, of the plurality of paths, where the second path is different than the first path, where the second node is included in the first path, and where the third node is included in the second path.

14. The non-transitory computer-readable medium of claim 8, where the plurality of transitions include:
a token transition between a first node, of the plurality of nodes, that contains a first string, of the plurality of strings, that includes one or more letters of a first word and a second node, of the plurality of nodes, that contains a second string, of the plurality of strings, that includes one or more letters of a second word different than the first word.

15. A method, comprising:
receiving, by a device, a search query,
the search query relating to a geographic location;
processing, by the device, the search query to parse the search query into a plurality of strings,
the plurality of strings including text;
determining, by the device, that one or more strings, of the plurality of strings, satisfy a condition, wherein determining that the one or more strings satisfy the condition includes determining that the one or more strings render the search query ambiguous;

generating, by the device and using the plurality of strings, a query graph that includes a plurality of paths relating to the condition, the query graph being a directed acyclic graph, and further including:

a plurality of nodes leading to and/or included in the plurality of paths, each node, of the plurality of nodes, corresponding to a category of data, of a plurality of categories of data, in a data structure, and a plurality of transitions between the plurality of nodes, wherein each transition, of the plurality of transitions, is associated with at least one letter or a word, and wherein a transition, of the plurality of transitions, is associated with adding a letter to the one or more strings in a subsequent node of the query graph such that the subsequent node resolves the ambiguous search query; and performing, by the device, one or more actions relating to the query graph to obtain, from the data structure, one or more search results that correspond to the search query.

16. The method of claim 15, where the plurality of nodes includes a root node at which traversal of the query graph begins, and one or more terminal nodes.

17. The method of claim 15, where generating the query graph includes associating one or more constraints with one or more nodes of the plurality of nodes.

18. The method of claim 15, where generating the query graph includes associating cost information with one or more nodes of the plurality of nodes.

19. The method of claim 18, where the cost information indicates a measure of quality of results that will be obtained from traversal of the one or more nodes.

20. The method of claim 15, where performing the one or more actions includes performing a search using a priority queue.

* * * * *